(12) United States Patent
Hansen et al.

(10) Patent No.: US 12,721,271 B2
(45) Date of Patent: Sep. 1, 2026

(54) HARVESTING MACHINE HAVING NON-CIRCULAR EXTRACTOR CLEANING CHAMBER

(71) Applicant: DEERE & COMPANY, Moline, IL (US)

(72) Inventors: Matthew J. Hansen, Thibodaux, LA (US); Dusk S. Mixon, Saint Amant, LA (US); Todd J. Rodrigue, Thibodaux, LA (US); Mark S. Louviere, Houma, LA (US); Jae-Jae Young, Thibodaux, LA (US)

(73) Assignee: Deere & Company, Moline, IL (US)

( * ) Notice: Subject to any disclaimer, the term of this patent is extended or adjusted under 35 U.S.C. 154(b) by 456 days.

(21) Appl. No.: 18/366,435

(22) Filed: Aug. 7, 2023

(65) Prior Publication Data

US 2024/0114838 A1 Apr. 11, 2024

Related U.S. Application Data

(60) Provisional application No. 63/414,041, filed on Oct. 7, 2022.

(51) Int. Cl.
*A01D 45/10* (2006.01)

(52) U.S. Cl.
CPC .................................. *A01D 45/10* (2013.01)

(58) Field of Classification Search
CPC ...................................................... A01D 45/10
See application file for complete search history.

(56) References Cited

U.S. PATENT DOCUMENTS 3,788,048 A * 1/1974 Stiff ....................... B01D 45/14 209/393
3,830,046 A * 8/1974 Rollitt .................... A01D 45/10 56/16.5
4,263,772 A * 4/1981 Phillips .................. A01F 29/12 56/13.3
5,092,110 A * 3/1992 Dommert .............. A01D 45/10 56/16.5

(Continued)

FOREIGN PATENT DOCUMENTS

CN 106171283 A * 12/2016 ............. A01D 45/10
WO WO-2020194330 A1 * 10/2020 ........... F04D 29/329
WO WO 2023141691 A1 8/2023

*Primary Examiner* — Arpad Fabian-Kovacs
(74) *Attorney, Agent, or Firm* — Taft Stettinius & Hollister LLP; Stephen F. Rost

(57) ABSTRACT

A separator for a crop harvester configured to harvest sugarcane. The separator includes an extractor body that defines a chamber, the chamber extending through the extractor body and is in fluid communication with a cavity of a fan housing. The extractor body can generally define an inlet opening of the chamber, the inlet opening positioned to allow chopped billets and crop residue that are outputted from a chopper assembly to enter into the chamber. The inlet opening has a non-round, or non-circular configuration and/or cross sectional shape. Further, the inlet opening can have a width similar to a material flow width of the chopped billets and crop residue being outputted from the chopper assembly. Such a configuration can eliminate dead zones with respect to air flow that is to pull the chopped crop materials into the chamber and/or to separate crop residue from the chopped billets.

20 Claims, 16 Drawing Sheets

(56) References Cited

U.S. PATENT DOCUMENTS

| | | | | |
|---|---|---|---|---|
| 11,357,171 | B2 * | 6/2022 | Fattepur | A01D 45/10 |
| 2004/0224735 | A1 * | 11/2004 | Hinds | A01D 45/10 460/70 |
| 2015/0327438 | A1 * | 11/2015 | Cazenave | A01D 45/10 56/51 |
| 2017/0108000 | A1 * | 4/2017 | Junior | F04D 29/384 |

* cited by examiner 140
148
122
156
138
144
154
158
146
150

122
158
146
140,144

138
148

HARVESTING MACHINE HAVING NON-CIRCULAR EXTRACTOR CLEANING CHAMBER

FIELD OF THE DISCLOSURE

The present disclosure generally relates to a harvesting machine, and more particularly, to an extractor used for harvesting a crop with a harvesting machine.

BACKGROUND

Sugarcane harvesters are used to harvest sugarcane and separate the stock of the sugarcane plant from other leafy debris. Often sugarcane harvesters have row dividers with scroll assemblies positioned thereon to orient the sugarcane crop in a substantially upright position prior to being cut along a base portion of the sugarcane plant. Once the plant is cut, the sugarcane harvester feeds the plant through a chopper assembly wherein the sugarcane plant is chopped into smaller pieces commonly referred to as billets.

The sugarcane harvester advances the billets along with crop residue (e.g., leafy material) to a primary extractor that separates at least a portion of the crop residue from the billets, and removes the crop residue from the sugarcane harvester. The primary extractor utilizes a fan or the like to separate the debris from the billets by passing the debris and billets through an air stream created by the fan. The air stream takes the lighter debris, such as sugarcane leaves or the like, among other crop residue, and moves the lighter debris through a hood of the extractor and out of the hood in a discharge direction. The heavier billets are left to be further processed by the sugarcane harvester.

Certain types of sugarcane harvesters can be configured such the chopped billets and crop residue are, following being chopped, thrown from a relatively small area at an outlet of the chopper assembly to a relatively significantly larger inlet area of the primary extractor. For example, certain sugarcane harvesters output the chopped billets and crop residue from an area of the chopper assembly having a diameter of around 36 inches to an inlet of the extractor that has a diameter of around 60 inches. Yet such differences in sizes can result in a relatively large portion of the air flow generated by the fan flowing outside of the stream of the chopped billets and crop residue that has been thrown out, or otherwise outputted, from the chopper assembly. For example, such differences in sizes between the flow width of the chopped billets and crop residue (also referred to as the cane material flow width) outputted from the chopper assembly and the diameter of the inlet of the primary extractor can result in dead zones along at least along opposing sides of the cane material flow width where air flow bypasses the outputted chopped billets and crop residue. Thus, the air flowing through such dead zones generally neither assists with directly pulling the chopped billets and/or crop residue into the primary extractor nor assists with the extraction of residue material, such as leaf material, for the chopped billets. Accordingly, such dead zones can adversely impact the efficiency in the operation of the primary extractor.

What is needed therefore is a sugarcane harvester including a harvesting system having a primary extractor structured to more efficiently pull and/or separate chopped billets and residue.

SUMMARY

An aspect of the subject disclosure is an extractor for a crop harvester that is configured to receive a crop material outputted from a chopper assembly of the crop harvester. The extractor can comprise an extractor body having a chamber that extends between a first end and a second end of the extractor body. The first end can be positioned to receive entrance of the crop material into the chamber. Further, the first end of the extractor body can define an inlet opening into the chamber, the inlet opening having a non-circular shape across the inlet opening.

Another aspect of the subject disclosure is an extractor for a harvesting machine, in which the extractor can comprise a nozzle wall having an upper end and a lower end, the nozzle wall being outwardly and upwardly inclined at a first angle from the lower end to the upper end. The upper end can be arranged at a first radius about a central axis, and the lower end can be arranged at a second radius about the central axis, the first radius being greater that the second radius. The extractor can further include a first deflector plate and a second deflector plate positioned on opposing sides of the central axis and abut the nozzle wall. The first and second deflector plates can each have a top wall, a bottom wall, and a face wall. The face wall can extend between the top wall and the bottom wall and be planar. Additionally, the first and second deflector plates can be outwardly and upwardly inclined at a second angle from the bottom wall to the top wall, the second angle being different than the first angle. Further, the bottom wall of the first deflector plate can define a first straight sidewall of a profile of an inlet opening of the extractor, and the bottom wall of the second deflector plate can define a second straight sidewall of the profile of an inlet opening.

Additionally, an aspect of the subject disclosure is an extractor having a fan assembly having a fan housing defining a cavity and an extractor body. The extractor body can define a chamber that extends from a first end of the extractor body to a second end of the extractor body. The chamber can be in fluid communication with the cavity. Additionally, the extractor body can define an inlet opening of the chamber at the first end, the inlet opening having a non-round shape. The second end of the extractor body can be coupled to the fan assembly.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

DETAILED DESCRIPTION

Figure 1:
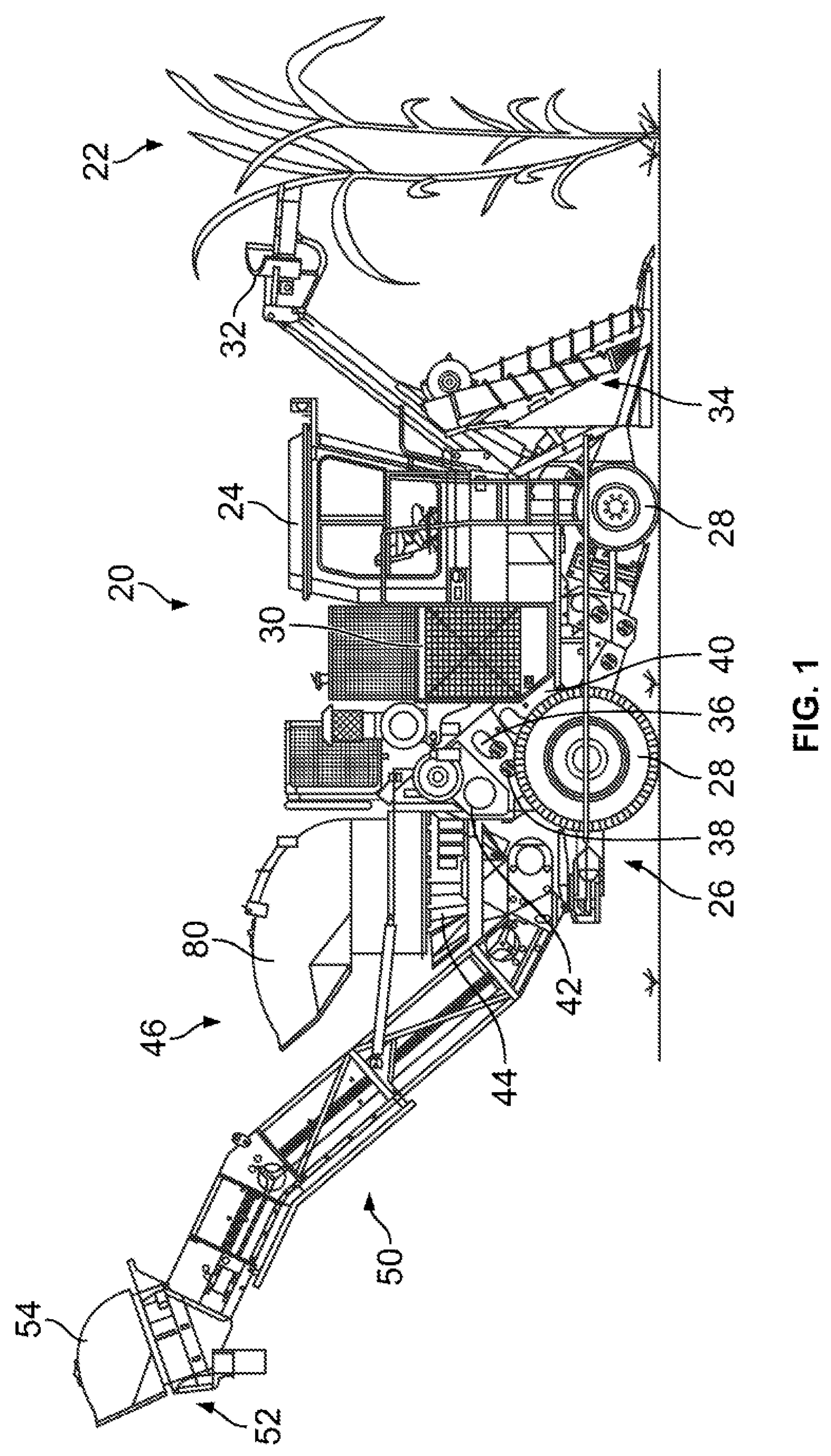
FIG. 1 illustrates a side elevational view of a work vehicle, and more specifically, of an agricultural vehicle such as a sugarcane harvesting machine.

For the purposes of promoting an understanding of the principles of the novel invention, reference will now be made to the embodiments described herein and illustrated in the drawings and specific language will be used to describe the same. It will nevertheless be understood that no limitation of the scope of the novel invention is thereby intended, such alterations and further modifications in the illustrated devices and methods, and such further applications of the principles of the novel invention as illustrated therein being contemplated as would normally occur to one skilled in the art to which the novel invention relates.

FIG. 1 illustrates a side view of a sugarcane harvester 20 adapted to cut sugarcane 22, with the front of the harvester 20 facing to the right. Accordingly, certain components of the harvester 20 may not be visible in FIG. 1. The harvester 20 includes a cab 24 located on a main frame 26 that is supported by wheels 28 configured to move the harvester 20 along rows of sugarcane 22. An engine is located within a housing 30 that moves the wheels 28 along a field to continually cut the sugarcane 22 for harvesting. In different embodiments, the engine also powers various driven components of the harvester 20. In certain embodiments, the engine directly powers one or more hydraulic pumps (not shown) and other driven components powered by the hydraulic motors via an embedded hydraulic system (not shown).

A cane topper 32 extends forward of the frame 26 in order to remove the leafy tops of sugarcane plants 22. A set of crop dividers 34 guides the stalks of sugarcane toward internal mechanisms of the harvester 20 for processing. As the harvester 20 moves across a field, sugarcane plants 22 passing between the crop dividers 34 are deflected downward by one or more knockdown rollers before being cut near the base of the plants 22 by a base cutter assembly, as would be understood by one skilled in the art. Rotating disks, guides, or paddles (not shown) on the base cutter assembly further direct the cut ends of the plants 22 upwardly and rearward within the harvester 20 toward successive pairs of upper feed rollers 36 and lower feed rollers 38. The feed rollers 36, 38 are supported by a feed roller chassis 40 which is supported by the main frame 26. The upper and lower feed rollers 36 and 38 convey the stalks toward a chopper drum module or assembly 42 for chopping the stalks into billets.

The chopper assembly 42 can include upper and lower chopper drums 56, 58 (FIG. 6) that rotate in opposite directions in order to chop the moving stalks into billets, as would be understood by one skilled in the art. The billets, including crop residue, are propelled into a cleaning chamber 44 that is located at the base of a primary extractor 46. The primary extractor 46, in different embodiments, includes a powered fan 68 (FIG. 2) to extract the crop residue, trash, and debris from the cleaning chamber 44. A loading elevator 50, with a one end located at the bottom of the cleaning zone 44, conveys the cleaned billets upward to a discharge location 52, below a secondary extractor 54, where the billets can be discharged into a truck, wagon, container, or other receptacle that collects the discharged billets. The secondary extractor 54 separates the crop residue from the cut stalk to clean the cut stalk.

Figure 2:
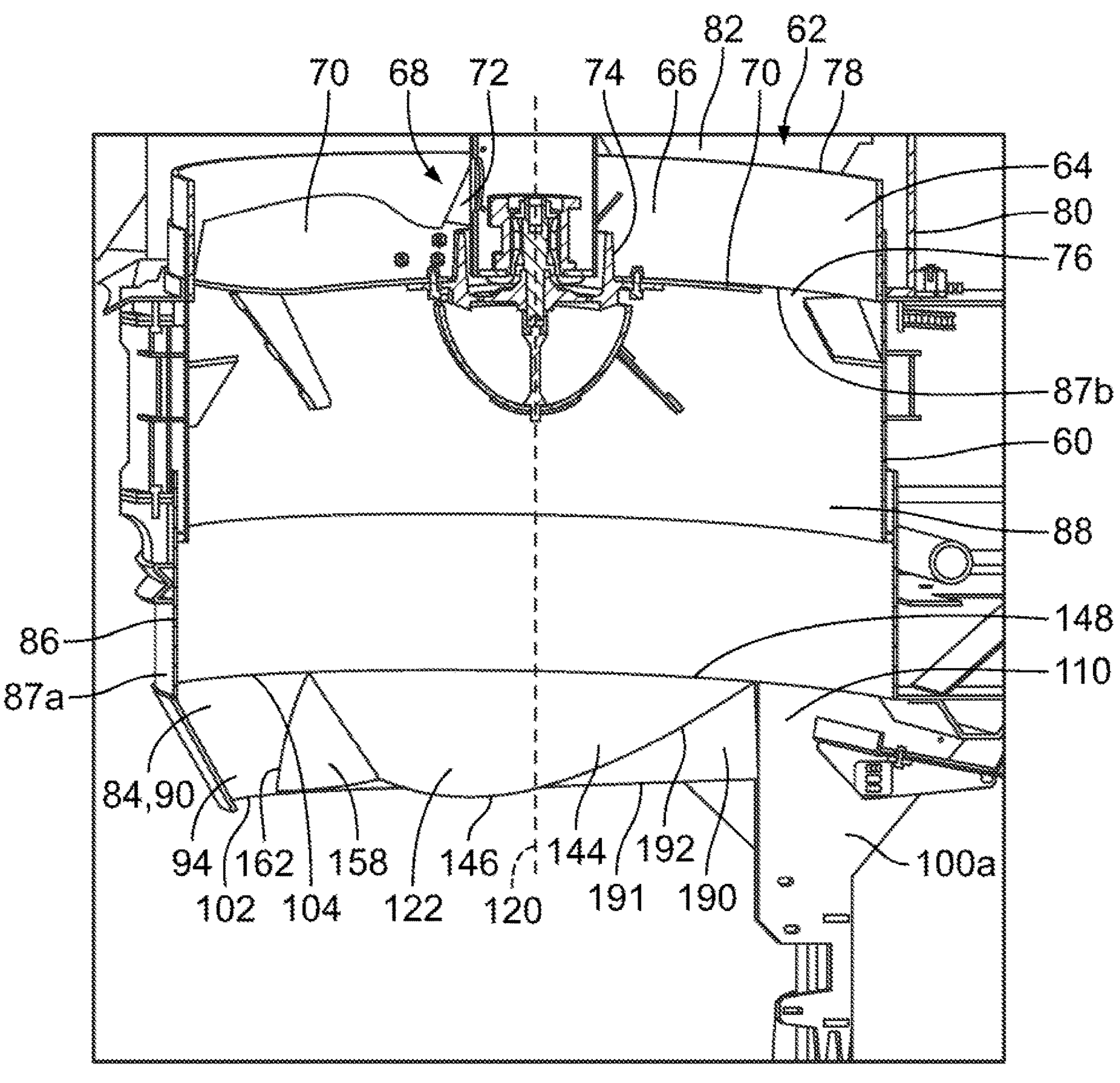
FIG. 2 illustrates a side sectional view of an extractor having an exemplary nozzle assembly and a fan assembly.
Figure 3:
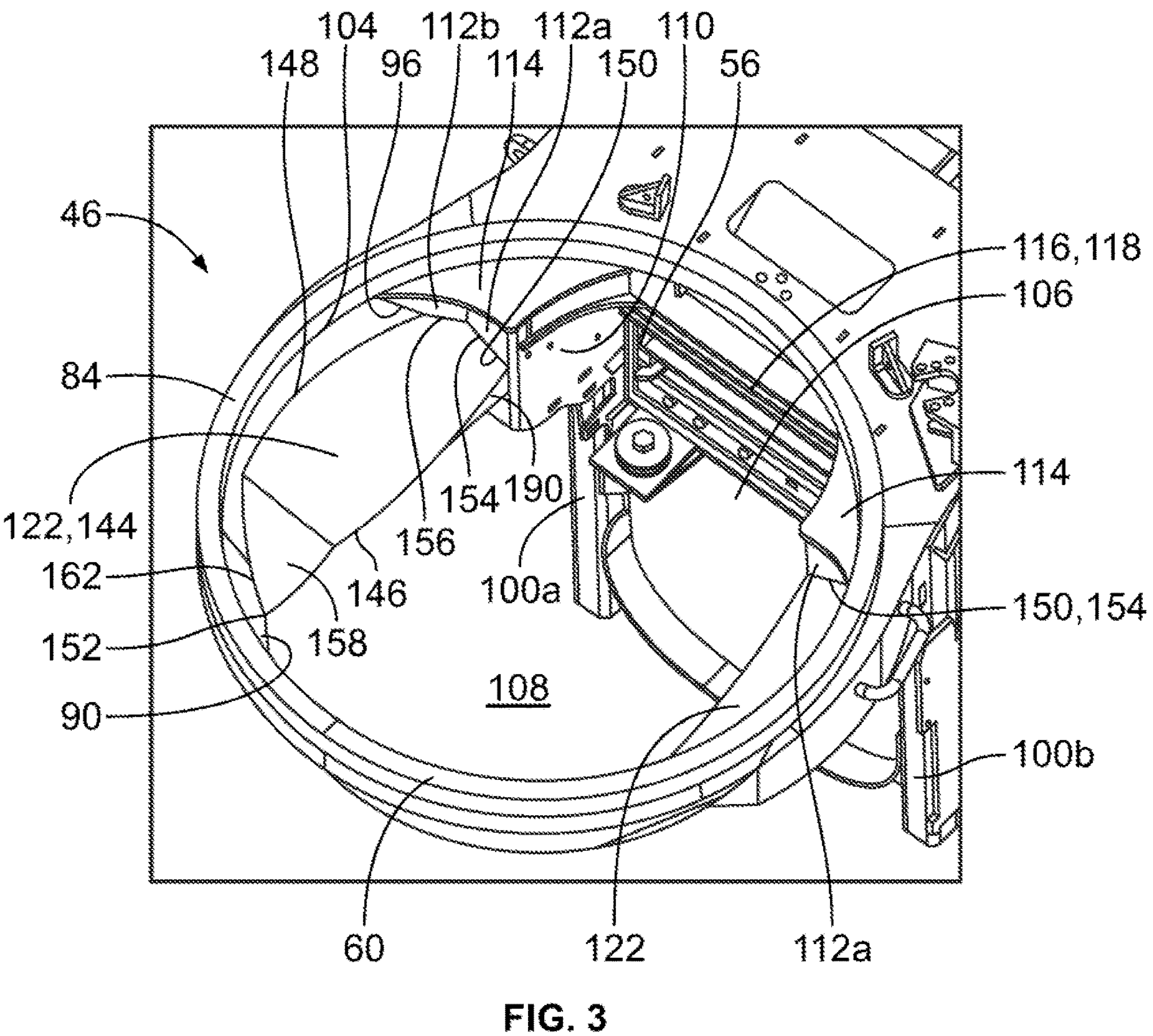
FIGS. 3 and 4 illustrate a top side perspective view and top view, respectively, of a portion of the extractor shown in FIG. 2.
Figure 4:
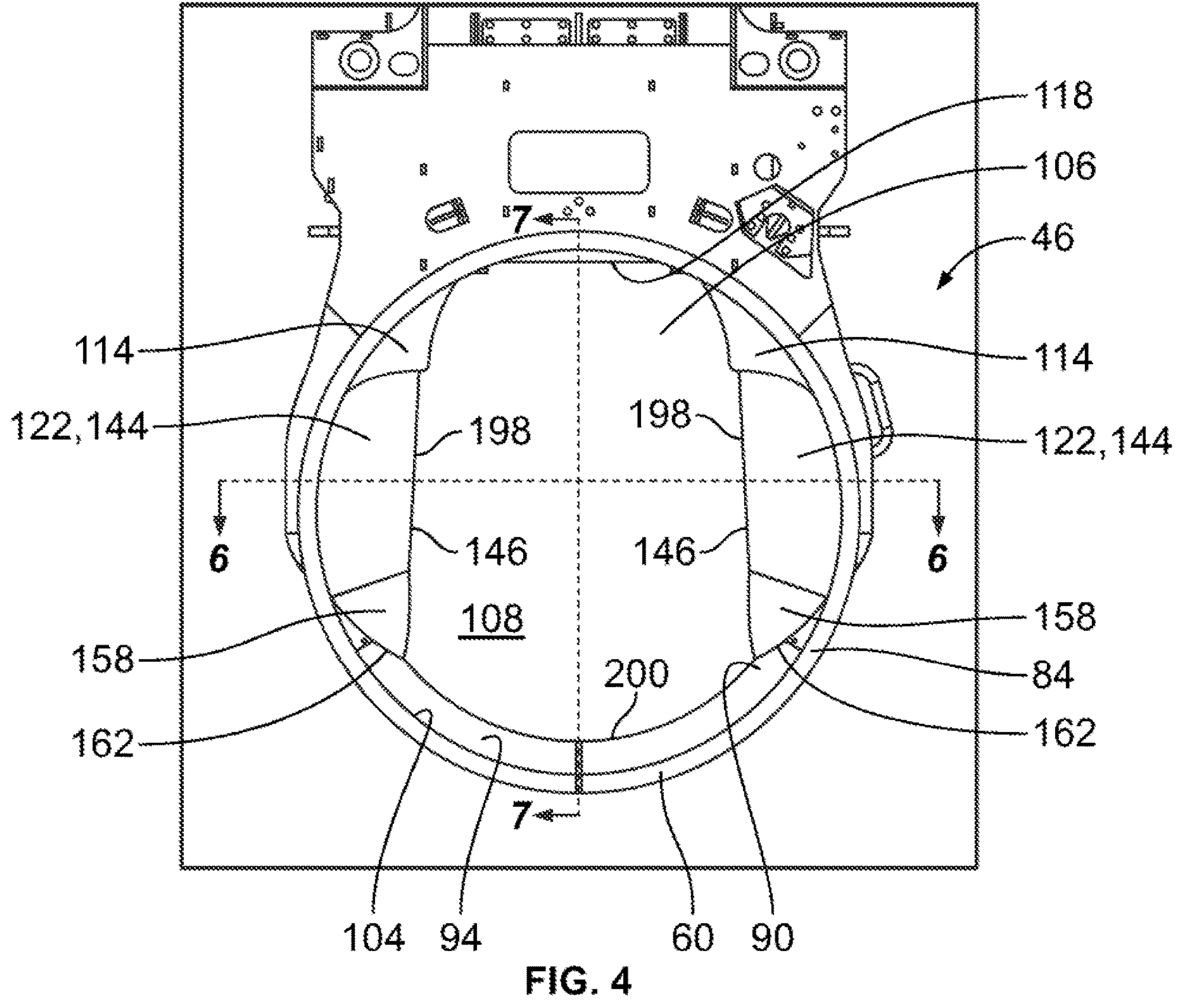

Referencing FIGS. 1 and 2, the primary extractor 46 can include an extractor body 60 coupled to a fan assembly 62. The fan assembly 62 can include a fan housing 64 that generally defines a cavity 66 in which at least a portion of the fan 68, and moreover, the blades 70 of the fan 68, are positioned and rotate. In one embodiment, the fan housing 64 is a generally cylindrical structure defining the cavity 66 in which the fan 68 is located. The fan 68 can include a fan motor 72 that drives the rotational displacement of the blades 70 of the fan 68. According to certain embodiments, the motor 72 is directly or indirectly mounted to the fan housing 64, such as, for example, indirectly attached to the fan housing 64 via a support bracket 74. The fan housing 64 can have a housing inlet 76 that is positioned adjacent to the extractor body 60, and an opposing housing outlet 78 through which crop residue can exit through the housing outlet 78 and into a hood 80 of the primary extractor 46. Moreover, the crop debris or residue, due to weighing less than the chopped billets, can be pulled away from the chopped billets, and into the fan housing 64. As the fan 68 rotates, the fan 68 can generate a flow of air in a direction that provides a negative pressure to move crop residue from the chopped billets and through the primary extractor 46.

At least crop residue can enter into, and subsequently exit from, an internal passageway 82 of the hood 80, the passageway 82 being in fluid communication with at least the cavity 66 of the fan housing 64. The hood 80 can be rotatably coupled to the primary extractor 46, such as, for example, at or around the fan housing 60. According to certain embodiments, the hood 80 can be rotatably displaced, such as, for example, via operation of a motor, among other actuators, that drives a linkage, such as, for example, a chain, that is coupled to the hood 80. Such rotational displacement of the hood 80 can be adapted to direct the direction at which crop residue is released from the primary extractor 46 via the passageway 82 of the hood 80.

Referencing FIGS. 3-8, the extractor body 60 can include an inlet portion 84 and a body portion 86 that generally define at least a portion of a chamber 88 that extends through the extractor body 60. A first end 87*a* of the body portion 86 is coupled to the inlet portion 84, while an opposing second end 87*b* of the body portion 86 is coupled to the fan assembly 62. The chamber 88 is in fluid communication with at least the cavity 66 of the fan housing 64, and thus also with the passageway 82 of the hood 80.

According to certain embodiments, the inlet portion 84 can include a nozzle assembly 90 having one or more deflection plate assemblies 92 and at least one nozzle wall 94. As indicated by at least FIGS. 2-4 and 6-8, the nozzle wall 94 can extend in a generally circular direction from a first end 96 to a second end 98 of the nozzle wall 94. According to the illustrated embodiment, the first and second ends 96, 98 of the nozzle wall 94 generally extend in a circular or round configuration from a first support bracket or post 100*a* to a second support bracket or post 100*b* of the primary extractor 46.

The nozzle wall 94 also extends generally outwardly and upwardly direction at a first incline angle from a lower end 102 to an upper end 104 of the nozzle wall 94. Thus, the diameter of the nozzle wall 94 at the lower end 102 can be smaller than a corresponding diameter of the nozzle wall 94 at the upper end 104, the upper end 104 being in closer proximity to the fan 68 than the lower end 102. Moreover, the nozzle wall 94 can have a generally open sided truncated conical shape or configuration, wherein an opening is present in a discharge area 106 between the first and second support brackets 100*a*, 100*b*, and generally adjacent to an outlet of the chopper assembly 42. According to certain embodiments, the lower end 102, which is at or near an inlet opening 108 of the inlet portion 84 and/or of the primary extractor 46, can have a diameter of approximately 60 inches, among other sizes. The inclined configuration of the nozzle wall 94 can be constructed to restrict the flow of air at the inlet opening 108, and thereby increase the flow air provided by operation of the fan 68 in connection with extracting crop residue from the chopped billets.

According to certain embodiments, the first and second support brackets 100*a*, 100*b* can each include one or more sidewalls 110, one or more face walls 112*a*, 112*b*, and one or more top walls 114, each of which may comprise portions of the support brackets 100*a*, 100*b*, associated posts, and/or cover plates, as well as combinations thereof, among other components. The sidewalls 110, as well as a portion of a guide plate 116, including an end wall 118 of the guide plate 116, and/or portions of the chopper assembly 42 that is/are positioned at least vertically above the region into which chopped billets and crop residue will outputted from the chopper assembly 42 can generally define at least a portion of the discharge area 106. As seen in at least FIGS. 2 and 3, as the sidewalls 110 of the support brackets 100*a*, 100*b* can extend below the inlet portion 84 and/or of the primary extractor 46, and can generally extend to a height near the second end 87*b* of the body portion 86, the discharge area 106 can extend nearly, if not all, of the entire vertical height of the chamber 88. Additionally, according to certain embodiments, a face wall 112*a* of the support brackets 100*a*. 100*b* can be generally perpendicular to the adjoined sidewall 110.

Figure 5:
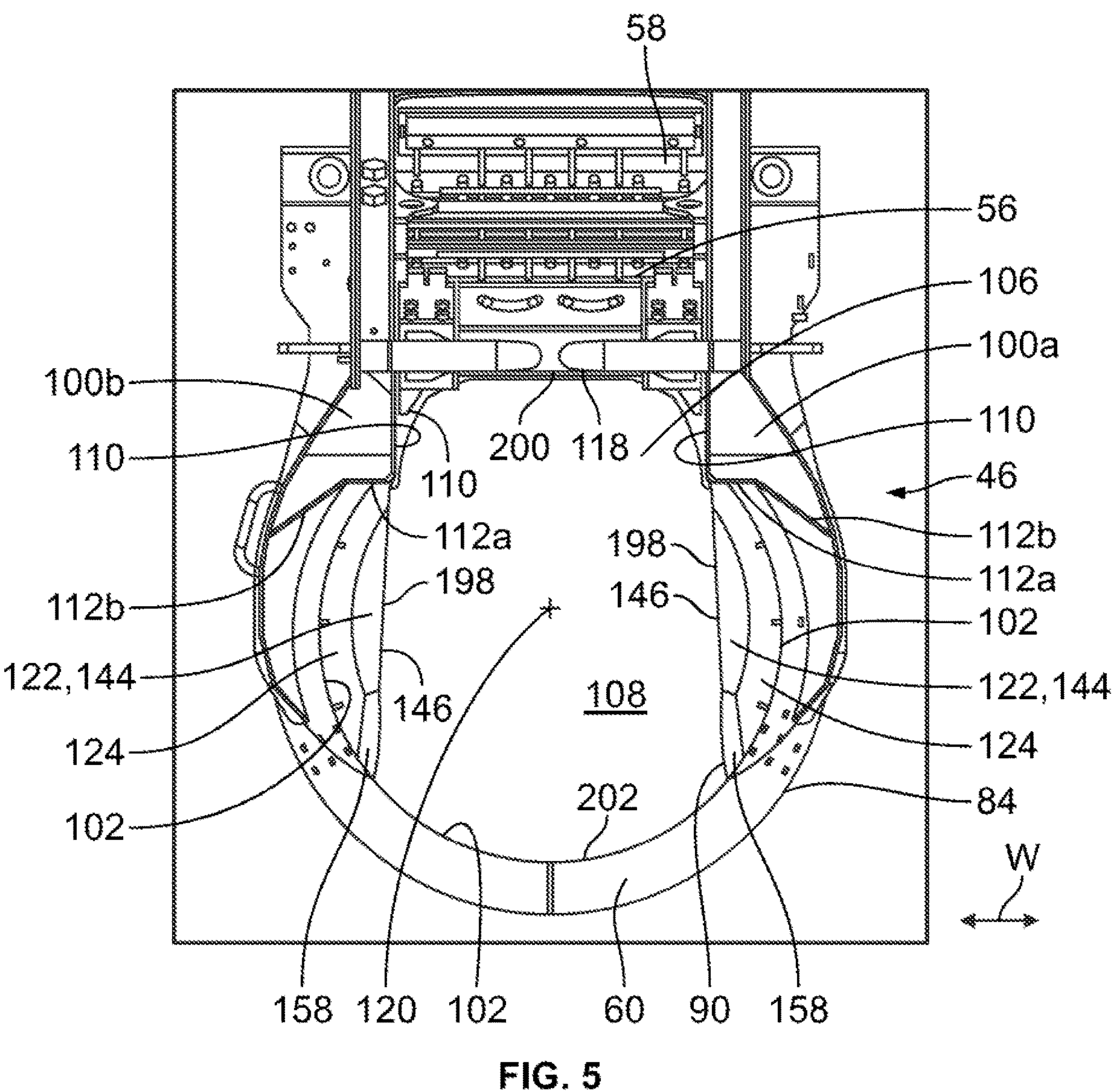
FIG. 5 illustrates a bottom view of the extractor shown in FIG. 3.

As seen in at least FIG. 5, according to certain embodiments, the sidewalls 110 of the first and second support brackets 100*a*, 100*b* can, at least in the inlet portion 84 of the primary extractor 46, have a relatively straight or flat configuration or orientation such that, at least in a vertical direction that is generally parallel to a central axis 120 (FIGS. 2 and 5) of the fan assembly 62, the sidewalls 110 are generally parallel to each other. Further, as also seen in FIG. 5, the sidewalls 110 can be generally perpendicular to the end wall 118 of the guide plate 116, thereby providing the discharge area 106 with a generally rectangular, square, or non-circular shape at least at, or in the vicinity of, the inlet opening 108 of the primary extractor 46.

Figures 9, 10:
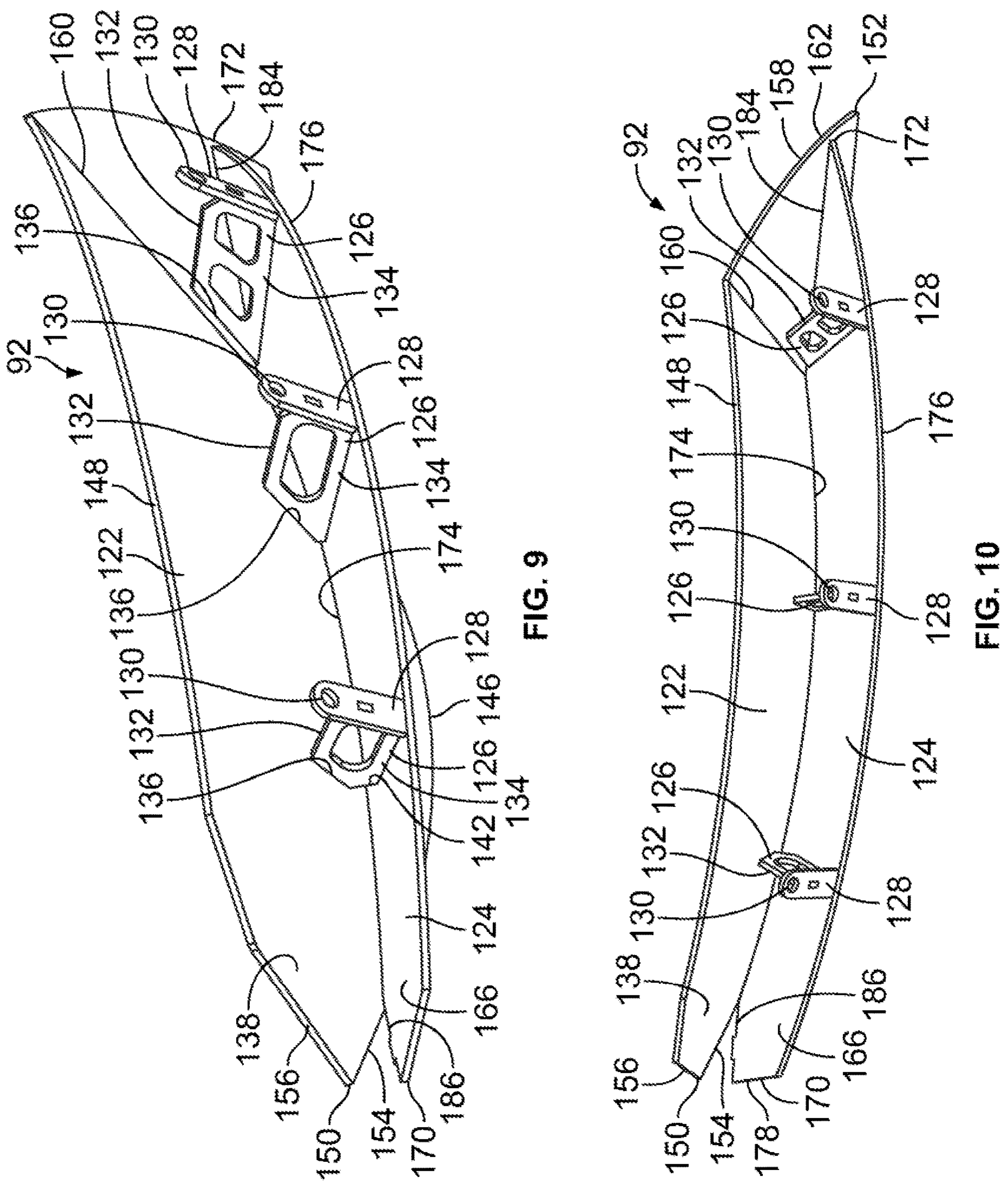
FIGS. 9 and 10 illustrate back side perspective views of an exemplary deflection plate assembly.

According to the illustrated embodiment, the nozzle assembly 90 includes a pair of deflection plate assemblies 92 that are positioned on opposing sides of the central axis 120 of the fan assembly 62. As seen in at least FIGS. 9 and 10, each deflection plate assembly 92 can include a deflector plate 122, a support plate 124, and a plurality of plate braces 126.

The plate braces 126 can be configured to secure the associated deflection plate assembly 92 to an adjacent portion of the nozzle wall 94, among other portions of the primary extractor 46. Thus, according to certain embodiments, the plate braces 126 can include a support wall 128 having an orifice 130 that may or may not be threaded, and which is sized to receive a mechanical fastener, such as, for example, a bolt, screw, and/or pin, among other fasteners, that can secure at least a portion of the plate braces 126, and thus the associated deflection plate assembly 92, to the nozzle wall 94. The plate braces 126 however can be secured to the nozzle wall 94 in a variety of other manners, including, for example, via one or more welds, among other manners of connection or attachment. Additionally, the deflector plate 122, alone or in combination with other components of the deflection plate assembly 92, can be directly or indirectly coupled to the nozzle wall 92 and/or inlet portion 84, in a variety of other manners. For example, according to other embodiments, instead of utilizing the support plate 124 and/or plate brace(s) 126, the deflector plate 122 can be welded to the nozzle wall 92, among other portions of the inlet portion 84. Alternatively, according to other embodiments, the inlet portion 84 may not include a nozzle wall 92 behind, or at least behind a portion of, the deflector plate 122. According to such an embodiment, in at least the region vertically above the deflector plate 122, the top wall 148 of the deflector plate 122 may provide a starting location for a portion of the nozzle wall 92, with the nozzle wall 92 in this region being generally limited to being positioned between the deflector plate 122 and the first end 87*a* of the body portion 86. According to another embodiment, the top wall 148 of the deflector plate 122 can generally extend to the first end 87*a* of the body portion 86, thereby generally eliminating the presence of the nozzle wall 92 both behind the deflector plate 122 and between the deflector plate 122 and the first end 87*a* of the body portion 86. Further, the support wall 128 can be angled between a top wall 132 and an bottom wall 134 of the plate brace 126 such that the support wall 128 is angled in a manner that conforms to, or generally mates, the angle at which the nozzle wall 94 extends between the lower and upper ends 102, 104 of the nozzle wall 94. Thus, for example, the support wall 128 can extend upwardly and outwardly in manner that is equal, approximately equal to, the above-mentioned first incline angle of the nozzle wall 94.

Figures 11, 12:
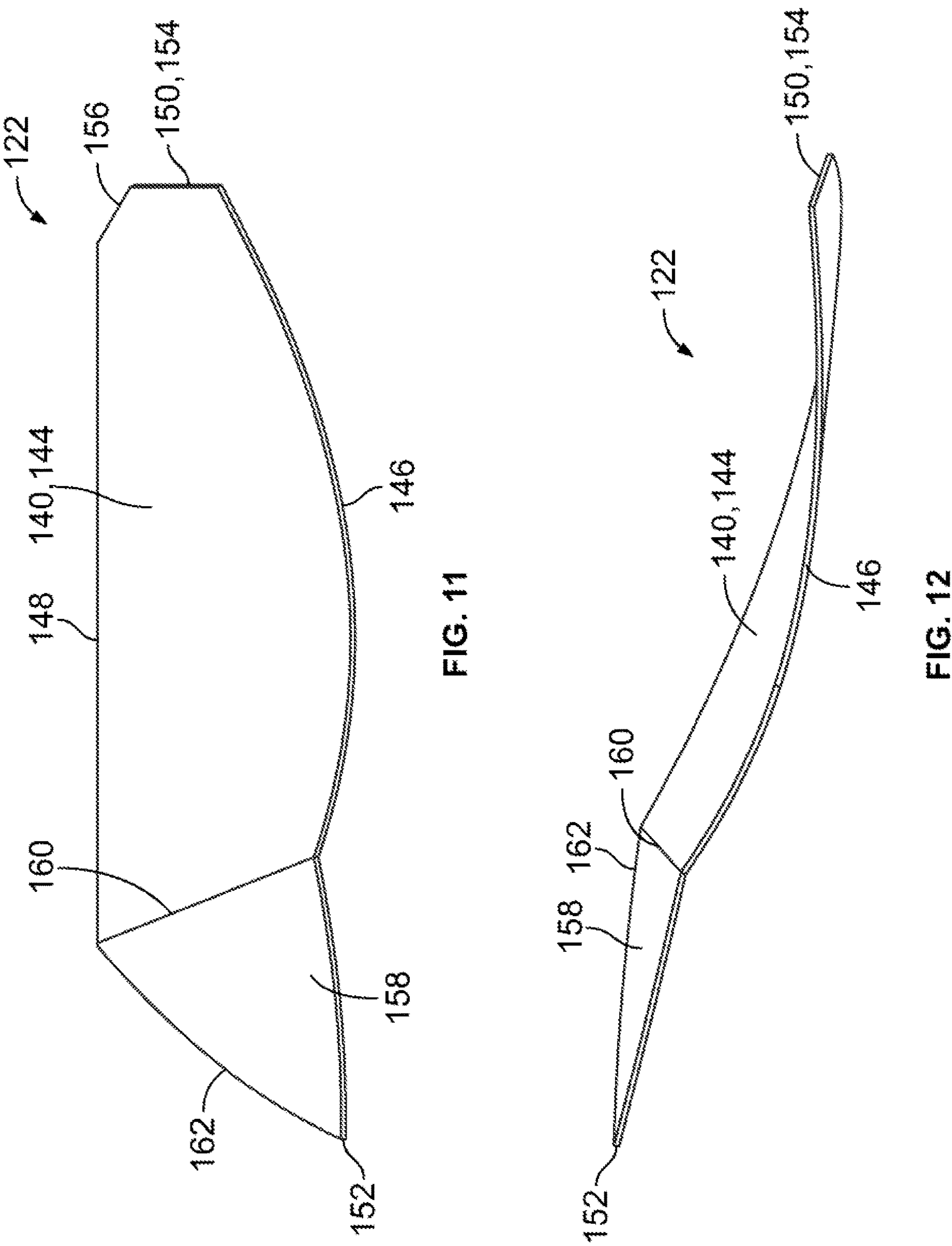
FIG. 11 illustrates an inner side view of an exemplary deflector plate of the deflection plate assembly seen in FIG. 9.
FIGS. 12-14 illustrate top perspective views of the deflector plate seen in FIG. 11.
Figures 13, 14:
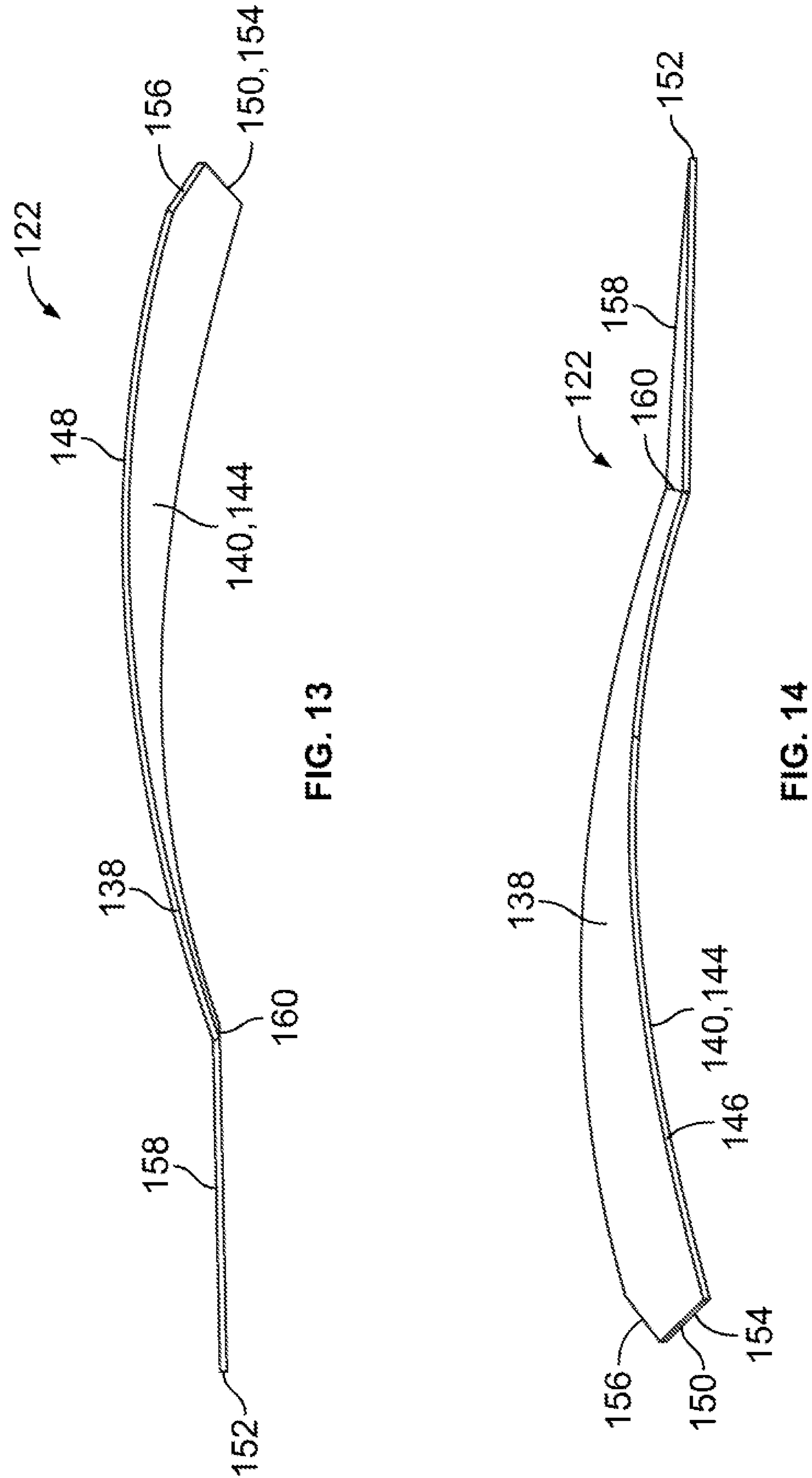
Figures 15, 16:
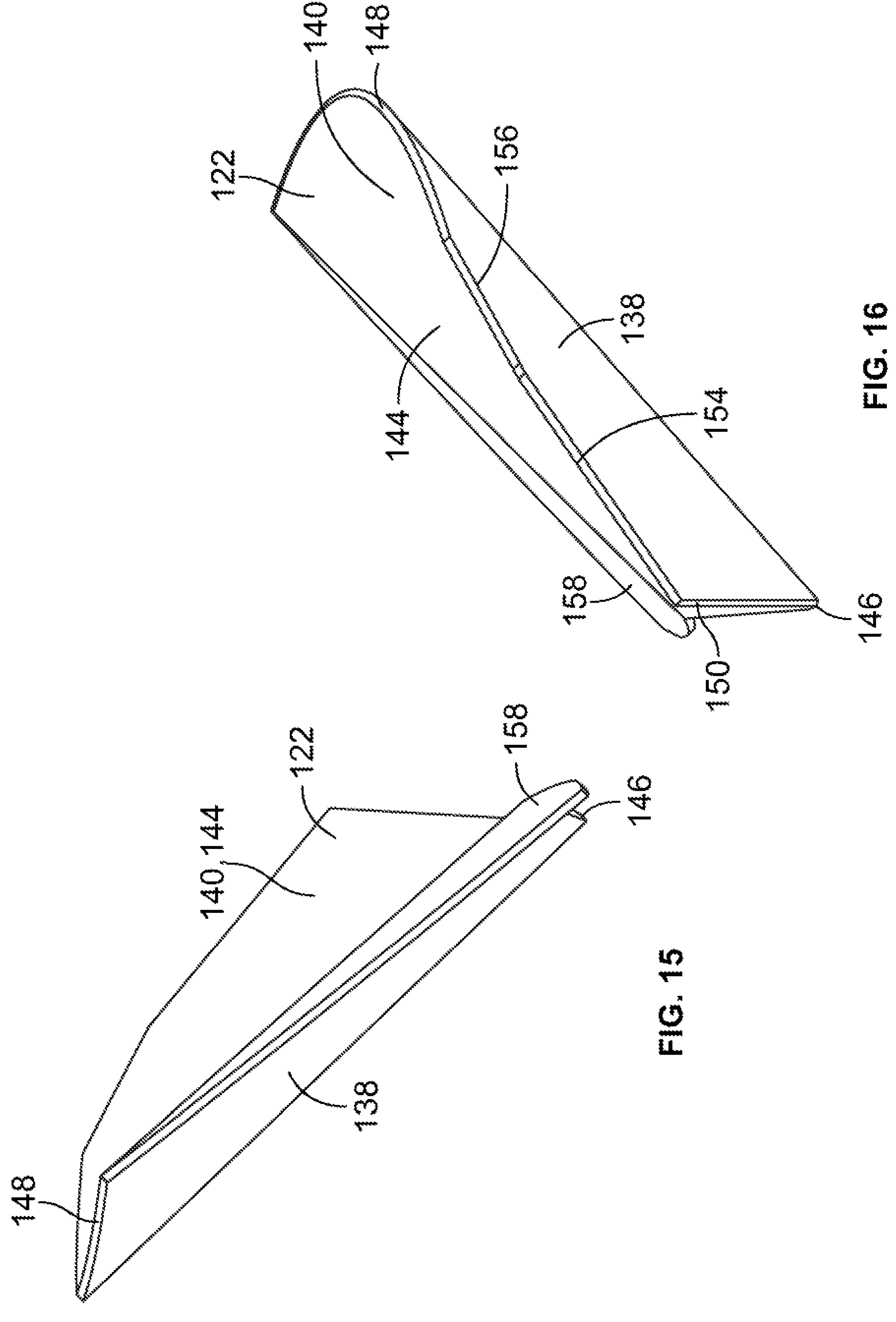
FIGS. 15 and 16 illustrate opposing side views of the deflector plate seen in FIG. 11.

The plate braces 126 can also include an angled alignment wall 136 that can be configured to, at least when the plate braces 126 are secured to the nozzle wall 94, abut against at least a portion of a back wall 138 of the adjacent deflector plate 122. The alignment wall 136 can be inclined from the bottom wall 134 to the top wall 132 of the plate brace 126 in a manner that at least assists in a first, nozzle section 140 (FIG. 11) of the deflector plate 122 being angularly positioned to provide, and/or orientated at, at a second incline angle, as discussed below. According to certain embodiments, the alignment wall 136 and the support wall 128 are on opposing sides of the plate brace 126, and thus the top and the bottom walls 132, 134 of the plate brace 126 can be positioned therebetween. Further, the alignment wall 136 of one or more of the plate braces 126 can include a truncated wall 142 such that the alignment wall 136 is offset from a location at which the support plate 124 abuts the back wall 138 of the deflector plate 122.

As illustrated in at least FIGS. 11-14, each deflector plate 122 has opposing back and face walls 138, 144, generally extends vertically between a bottom wall 146 and a top wall 148, and generally extends in a horizontal direction from a first end 150 to an opposing second end 152. Similar to the first and second ends 96, 98 of the nozzle wall 94, the first end 150 of each deflector plate 122 can be configured to abut against, and/or be coupled to, one or more walls of the adjacent support bracket 100*a*, 100*b*, such as, for example, the face walls 112*a*, 112*b*. Thus, the first end 150 of the defector plate 122 can, for example, have a first lower sidewall 154 that is configured to abut against a front wall 112*a* of an adjacent support bracket 100*a*, 100*b*, and a first upper sidewall 156 that abuts against another face wall 112*b* of the support bracket 100*a*, 100*b*. Thus, the first lower sidewall 154, which can extend between the bottom wall 146 and the first upper sidewall 156, can extend in a direction, or otherwise have a configuration or orientation, that is different than a direction at which the first upper sidewall 156 of the deflector plate 122 extends toward the top wall 148. In the illustrated exemplary embodiment, the first lower sidewall 154 generally extends upwardly and outwardly from the bottom wall 146 to the first upper sidewall 156, while the first lower sidewall 154 generally extends in an upwardly and inwardly direction from the first lower sidewall 154 to the top wall 148. Additionally, while the bottom wall 146 is shown in at least FIG. 11 as having various contours or curvatures between the first and second ends 150, 152 of the deflector plate 122, the bottom wall 146 can have a variety of other shapes and configurations, as well as various combinations of shapes and configurations. For example, according to certain embodiments, the bottom wall 122 can be a generally straight or flat surface that extends between either the first and second ends 150, 152 of the deflector plate 122, the first end 150 and a section wall 160 of the deflector plate 122, or the second end 152 and the section wall 160.

According to certain embodiments, the deflector plate 122 can have a first, nozzle section 140, and a second, deflection section 158, the first, nozzle section 140 extending between the first end 150 of the deflector plate 122 and the second, deflection section 158, and the second, deflection section 158 extending between the first, nozzle section 140 and the second end 152 of the deflector plate 122. According to certain embodiments, the first, nozzle section 140 and the second, deflection section 158 can be separated, and/or adjoined to each other, at a section divider or wall 160. Moreover, the section wall 160 can provide a location at which the deflector plate 122 transitions from the first, nozzle section 140 to the second, deflection section 158, and vice versa. According to certain embodiments, the deflector plate 122 can have a monolithic construction wherein the deflector plate 122, including the shapes and configurations for the first, nozzle section 140 and the second, deflection section 158, is formed from a single sheet of material via one or more stamping operations. Alternatively, the deflector plate 122 can comprise a plurality of separate pieces, such as, for example the first, nozzle section 140 and the second, deflection section 158 being separately formed and joined to each other, such as, for example, via a weld(s) and/or mechanical fasteners, including, but not limited to, screws, bolts, pins, and/or rivets, among other fasteners, Further, according to certain embodiments, the top wall 148 of the deflector plate 122 can extend along the first, nozzle section 140, and generally terminate at the section wall 160.

The first, nozzle section 140 can have a configuration similar to a segment of a truncated cone. Thus, the first, nozzle section 140 can extend at the upper wall 148 along a radius that is larger than the corresponding radius at which the bottom wall 146 of the first, nozzle section 140 extends. Accordingly, the length of the bottom wall 146 along the first, nozzle section 140 can be shorter than the length of the upper wall 148 along the first, nozzle section 140.

The first, nozzle section 140 can also, at least when the deflection plate assembly 92 is secured to the nozzle wall 94, be angularly oriented at a second incline angle in a generally outwardly and upwardly direction as the first, nozzle section 140 extends from the bottom wall 146 to the top wall 148 of the deflector plate 122. The second incline angle can be different than the above-mentioned first incline angle of the nozzle wall 94, such as, for example, be a larger or a steeper angle than the first incline angle. Further, at least the first lower sidewall 154 at the first end 150 of the deflector plate 122 and the section wall 160 between the first, nozzle section 140 and the second, deflection section 158, can be also be outwardly and upwardly inclined from the bottom wall 146 to the top wall 148 of the deflector plate 122. Thus, the first lower sidewall 154 and the section wall 160 can diverge away from each other as the first lower sidewall 154 and the section wall 160 extend away from the bottom wall 146.

The second, deflection section 158 can comprise an arc shaped sidewall 162 that is generally downwardly sloped or angled from the section wall 160 to the second end 152 of the deflector plate 122. Further, the sidewall 162 can generally define the vertical height of the second, deflection section 158. Thus, as seen in at least FIG. 11, according to certain embodiments, the second, deflection section 158 has a generally triangular shape. Additionally, to the extent the second, detection section 158 has a curvature(s) along the vertical height of the second, deflection section 158, such as, for example, between the sidewall 162 and the bottom wall 146, such a curvature(s), if any, can have a radius that is different than the radius at the top wall 148 and/or at the bottom wall 146 of the first, nozzle section 140. Thus, as seen in at least FIGS. 11-16, the second, deflection section 158 and the first, nozzle section 140 have different configurations, orientations, and/or and shapes at least along the corresponding face wall 144, back wall 138, and bottom wall 146 of the deflector plate 122. Further, the second, deflection section 158 and the first, nozzle section 140 are generally not coplanar with each other.

The downwardly sloped or angled configuration of the second, deflection section 158 can assist in prevent a buildup of crop residue and/or chopped billet on the second, deflection section 158. Moreover, at least the portion of the face wall 144 that extends along the second, deflection section 158 can be configured to facilitate sliding of such materials off of the second, deflection section 158 in a generally inwardly and/or downwardly direction toward the inlet opening 108 of the primary extractor 46 and/or into the air flow that is passing through the chamber 88.

Figure 17:
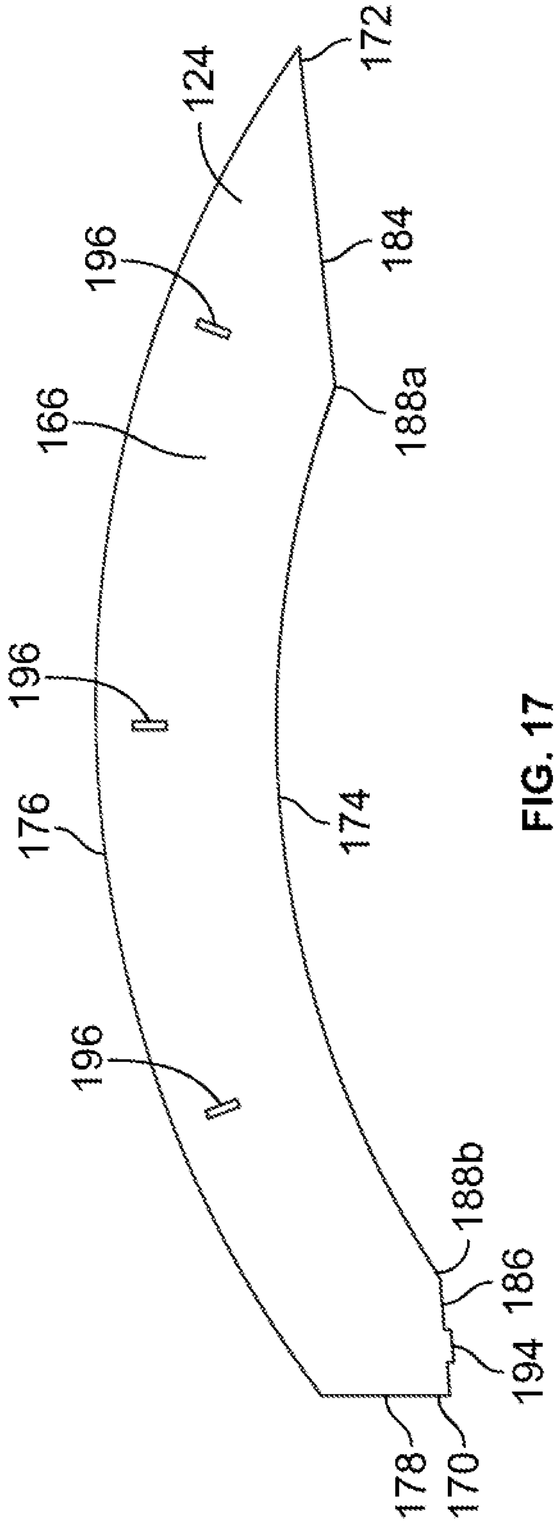
FIGS. 17 and 18 illustrate a bottom view and top side perspective view, respectively, of an exemplary support plate for the deflection plate assembly shown in FIG. 9.
Figure 18:
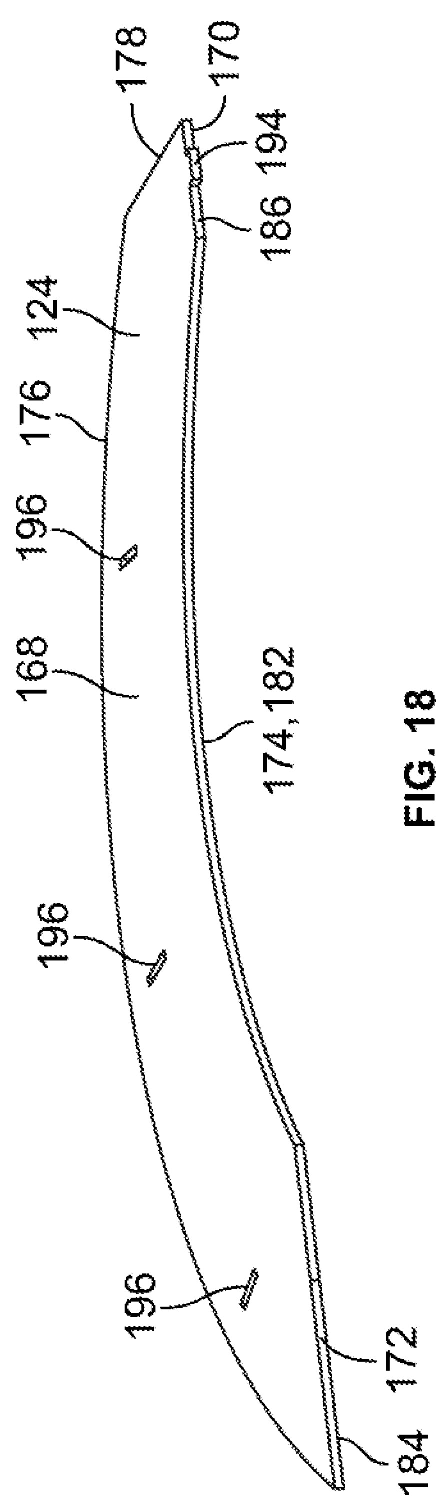

Referencing FIGS. 17 and 18, the support plate 124 can have opposing top and bottom sides 166, 168, and extend between opposing first and second ends 170, 172. A thickness of the support plate 124 between the top and bottom sides 166, 168 can provide the support plate 124 with an inner edge 174 and an outer edge 176, and a side edge 178.

The inner edge 174 of the support plate 124 can be configured to abut against adjacent portions of the back wall 138 of the deflector plate 122. According to certain embodiments, such abutment between the inner edge 174 and the back wall 138 can be configured to prevent or minimize the presence of spaces or gaps between the inner edge 174 and the adjacent back wall 138 of the deflector plate 122. Further, as seen in at least FIGS. 9 and 10, according to certain embodiments, the inner edge 174 can extend along substantially the entire width of the deflector plate 122, as well as beyond the first end 150 of the deflector plate 122.

The inner edge 174 of the support plate 124 can include a nozzle section 182, a plate section 184, and a support section 186. The nozzle section 182 can be positioned between the plate section 184 and the support section 186. Further, the nozzle section 182 can be configured to generally abut the back wall 138 of the deflector plate 122 along at least a portion of the first, nozzle section 140 of the deflector plate 122, and the plate section 184 can be configured to abut the back wall 138 along at least a portion of the second, deflection section 158 of the deflector plate 122. Accordingly, the nozzle section 182 of the inner edge 174 can have a shape, such as, for example, a curvature, that is generally equal to, or mates, the radius or curvature of the portion of the back wall 138 to which the inner edge 174 will abut.

The plate section 184 can be angled or inclined away from an end 188*a* of the nozzle section 182, and may comprise a relatively straight or flat surface. The angle at which the plate section 184 extends away from the nozzle section 182 can generally conform to the angle at which the portions of the second, deflection section 158 to which the plate section 184 abuts extends away from the first, nozzle section 140 and/or the section wall 160. Further, according to certain embodiments, the plate section 184 can extend from an end 188*a* of the nozzle section 182 to the outer edge 176, and thereby can generally provide the second end 172 of the support plate 124.

The support section 186 of the inner edge 174 extends away from an end 188*b* of the nozzle section 182 that is opposite of the end 188*a* to which the plate section 184 extends, as well as extends in an opposing direction and at a different angle than the plate section 184. Moreover, the support section 186 comprises a relatively straight or flat surface that, when coupled to a mating transition plate 190 (FIG. 7), is generally parallel to the sidewalls 110 of the support brackets 100*a*, 100*b*.

The transition plate 190 can be secured to the face wall 112*a* of each support bracket 100*a*, 100*b*, and extend from the face wall 112*a* in a direction that can be generally parallel to the sidewalls 110 of the support brackets 100*a*, 100*b*. Further, the transition plate 190 can have an upper wall 192 that is curved to generally correspond, and mate, the curvature of an adjacent portion of the bottom wall 146 of the deflector plate 122 to which the upper wall 192 can generally abut. According to certain embodiments, the support section 186 includes an outwardly extending protrusion or tab 194 that is received in a mating slot 196 of the transition plate 190 that can assist in securing the support plate 124 to the transition plate 190, and/or which can assist in supporting the support plate 124 and/or the deflection plate assembly 92 to other portions of the primary extractor 46.

According to certain embodiments, the deflector plate 122 and the transition plate 190 can, together, have a monolithic construction. For example, according to certain embodiments, the deflector plate 122 and the transition plate 190 can be formed from a single sheet of material via one or more stamping operations, among other forming operations. Alternatively, according to certain embodiments, the transition plate 190 can be adjoined or attached to the deflector plate 122, such as, for example, via a weld(s) and/or mechanical fasteners. As previously discussed, the deflector plate 122 can, for example, have a monolithic or unitary construction. Further, the bottom wall 146 of the deflector plate 122 can extend from an adjacent bottom wall 191 (FIG. 2) of the transition plate 190 in manner in which the bottom wall 146 of the deflector plate 122 and the bottom wall 191 of the transition plate provide, together, a continuous flat or straight edge, or alternatively, a generally continuous curvature, at least across a corresponding portion of the inlet opening 108 to the chamber 88.

The support section 186, and thus, the inner edge 174, can generally extend to a side edge 178 of the support plate 124 that is located at the first end 170 of the support plate 124. The side edge 178 can be configured to abut a face wall 112*a* of the support plate 124. According to certain embodiments, the side edge 178 is generally perpendicular to the support section 186 of the inner edge 174.

As seen in FIGS. 17 and 18, the outer edge 176 of the support plate 124 can have a generally curved or arc configuration. According to certain embodiments, the curvature of the outer edge 176 is configured to match the curvature along the portion of the nozzle wall 94 to which the outer edge 176 will be adjacent and/or abut. Further, according to certain embodiments, the outer edge 176 of the support plate 124 is configured to abut an adjacent portion of the nozzle wall 94 so as to prevent, or minimize, the presence of spaces or gaps therebetween.

As also seen in at least FIGS. 17 and 18, the support plate 124 can have a plurality of slots 196 that are each adapted to receive mating a protrusion or tab that may extend from the bottom wall 134 of a plate brace 126. The protrusions of the plate braces 126 can extend at least through the top and bottom sides 166, 168 of the support plate 124. Accordingly to certain embodiments, the bottom wall 134 of the plate brace 126 can be positioned on the top side 166 of the support plate 124 at a location at which the tab of the plate brace 126 extends through at least a portion, if not all, of a slot 196 in the support plate 124.

Figure 6:
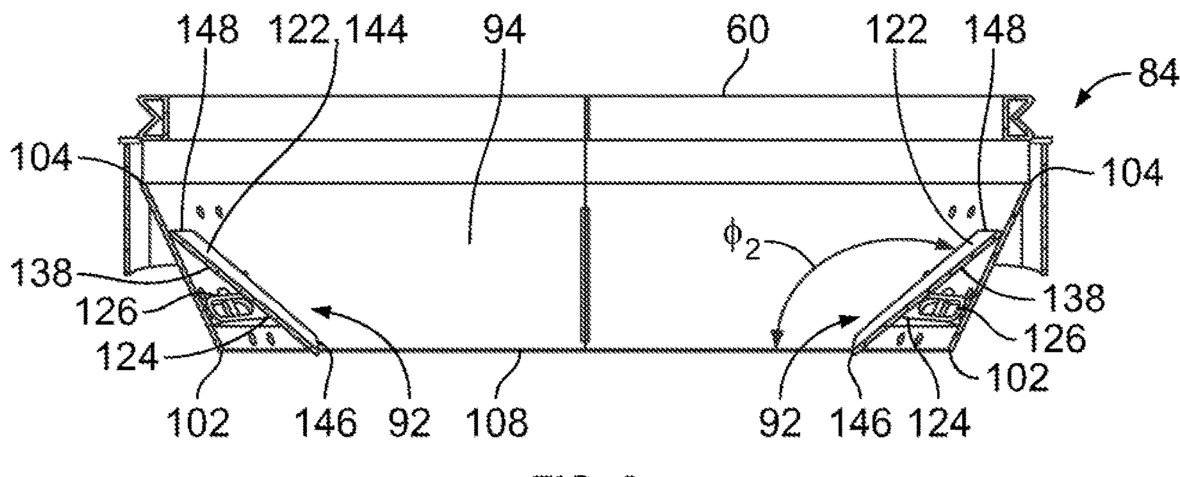
FIG. 6 illustrates a cross sectional view of the extractor taken along line 6-6 in FIG. 4.
Figure 7:
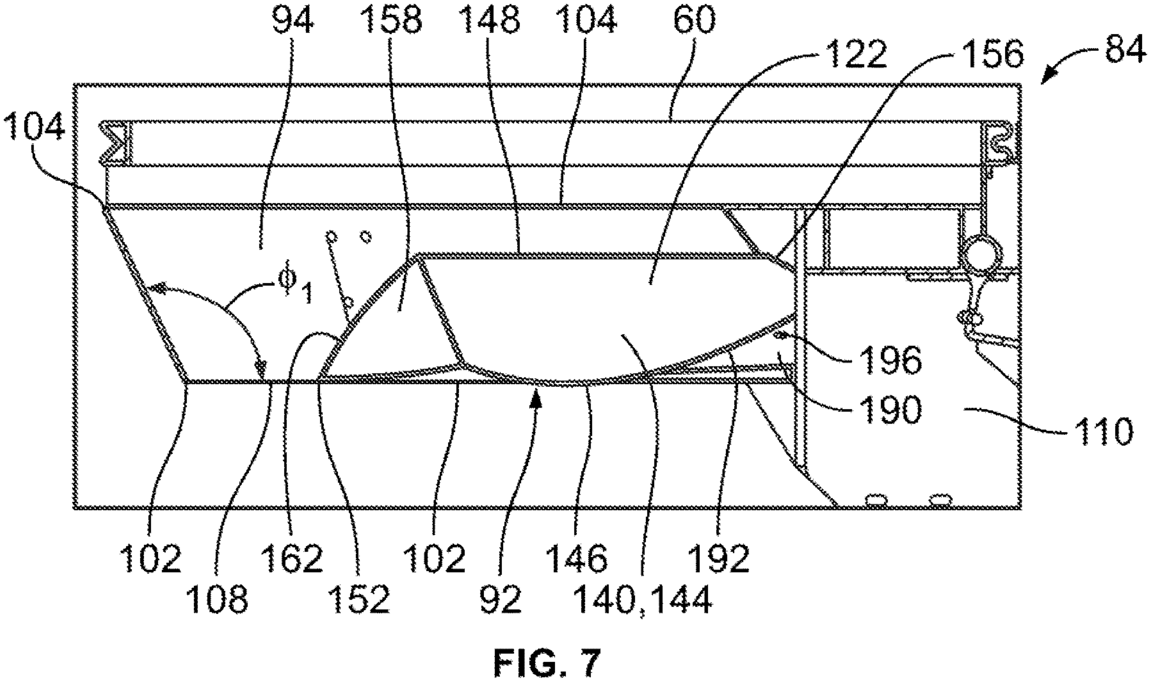
FIG. 7 illustrates a cross sectional view of the extractor taken along line 7-7 in FIG. 4.
Figure 8:
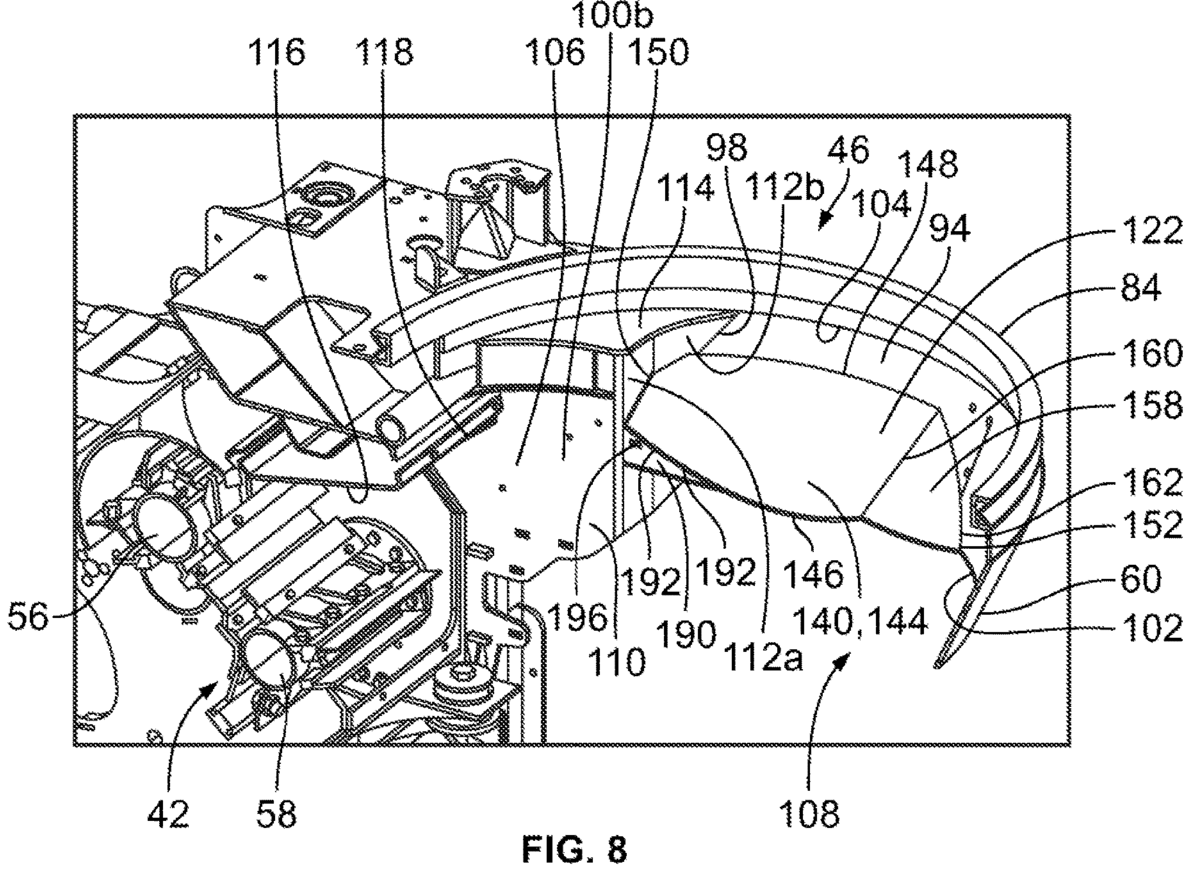
FIG. 8 illustrates a cutaway view of the extractor shown in FIG. 3.

As seen in at least FIGS. 6 and 7, the deflection plate assembly 92 is secured within the primary extractor 46 such that at least the first, nozzle section 140 of each deflector plate 122 is oriented at a second inclined angle (+) that is larger or is steeper than a first inclined angle (I) of the nozzle wall 94. Further, as seen in at least FIGS. 2, 6, and 7, each deflection plate assembly 92 is also positioned within the primary extractor 46 so the bottom wall 146 of the associated deflector plate 122 generally defines at least a portion of the inlet opening 108 to the chamber 88 of the of the primary extractor 46. As seen in at least FIG. 5, with such positioning of the deflector plates 122, the bottom wall 146 of the deflector plates 122, in combination with the adjacent sidewalls 110 of the support brackets 100*a*, 100*b*, can generally define opposing sidewalls 198 of the inlet opening 108 to the chamber 88. As also seen in at least FIG. 5, such sidewalls 198 can be generally parallel to each other. Additionally, according to certain embodiments, the distance between the sidewalls 198 can be similar to, if not slightly larger than, a width (as generally indicated by the direction "w" in FIG. 5) between opposing ends of the upper and/or chopper drum(s) 56, 58. Thus, such width between the sidewalls 198 can be similar to, if not slightly larger than, the cane material flow width. Further, as also seen, the deflector plates 122 can be positioned such that a portion of the nozzle wall 94 is exposed directly above, and extends at the first inclined angle from, the top wall 148 of the deflector plates 122.

The inlet opening 108 of the chamber 88 can also include a front side 200 and a back side 202, the front and back sides 200, 202 being on opposing sides of the central axis 120 of fan assembly 62 and generally adjoined to opposing ends of the above-mentioned sidewalls 198 of the inlet opening 108. The front side 200 can be generally defined at least in part by the end wall 118 of the guide plate 116, or by other portions of the chopper assembly 42 and/or the inlet portion 84 of the primary extractor 46, and or by the above-discussed discharge area 106. Additionally, as seen in FIG. 5, the front side 200 of the inlet opening 108 to the chamber 88 can be generally perpendicular to the above-mentioned sidewalls 198 of the inlet opening 108. Thus, as seen in at least FIG. 5, the inlet opening 108 to the chamber 88 at least on a chopper assembly 42 side of the central axis 120 of the fan assembly 62 can have a generally rectangular or square configuration, and moreover is non-circular or rounded.

The back side 202 of the inlet opening 108 to the chamber 88 can be generally defined by a portion of the lower end 102 of the nozzle wall 94 that extends between the sidewalls 198 of the inlet opening 108. Thus, unlike the relatively straight sidewalls 198 and front side 200 of the inlet opening 108 to the chamber 88, the back side 202 of the inlet opening 108 can have a generally have a curved configuration. Further, according to certain embodiments, the back side 202 can be in the trajectory path at which the chopper assembly 42 a least initially discharges or throws the chopped billets and residue crop material. However, according to other embodiments, another deflection plate assembly 92 having a deflector plate 122 having a similar, or different, configuration could be positioned along at least a portion of the nozzle wall 94 around the back side 202. According to such an embodiment, the bottom wall of the deflector plate could generally define a straight or flat back side 202 of the inlet opening 108 that can be positioned between as well as be generally perpendicular to, the sidewalls 198 of the inlet opening 108.

Figure 19:
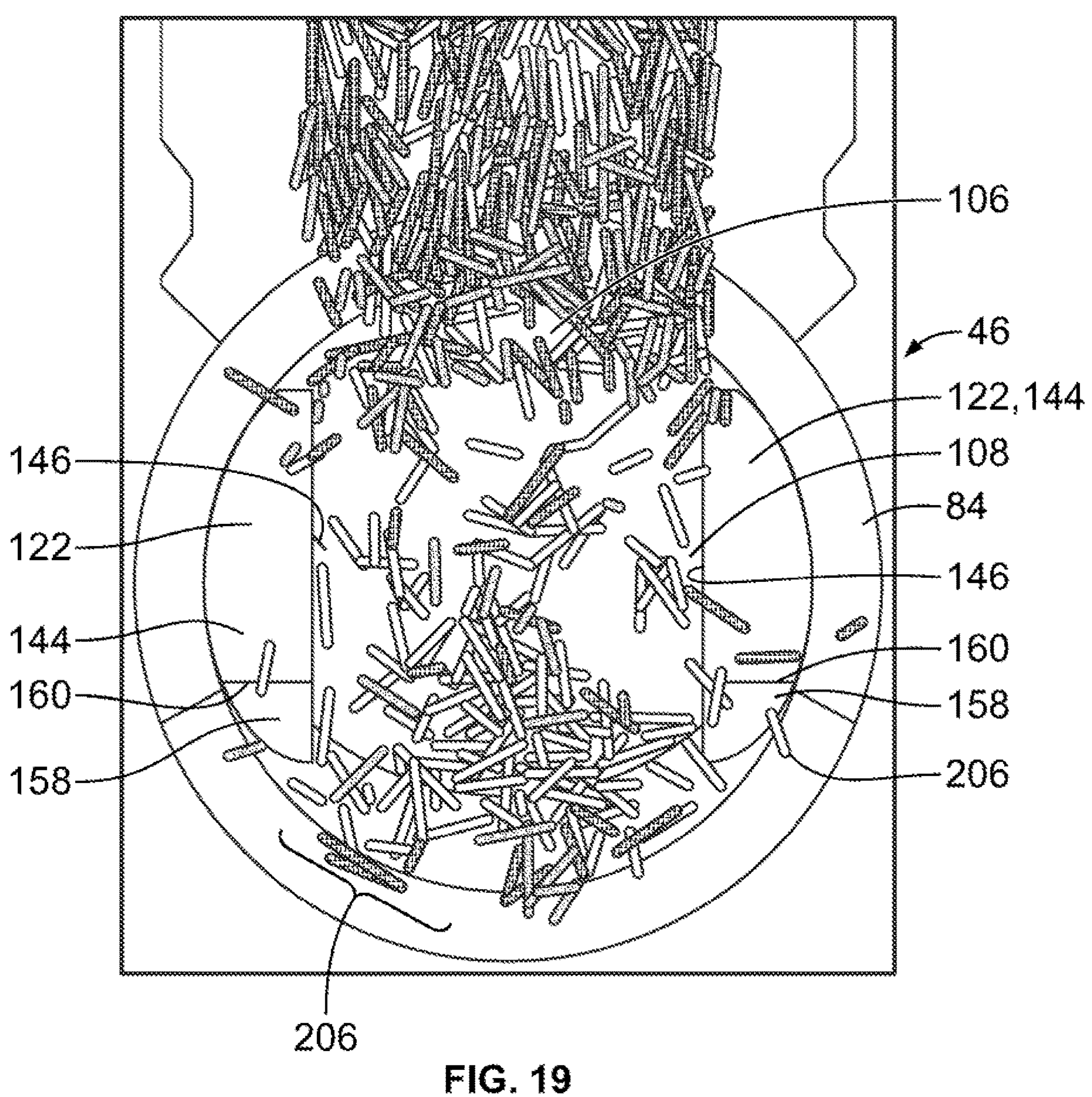
FIG. 19 illustrates and exemplary flow of chopped billets and crop residue outputted from a chopper assembly and directed toward a bottom side of the extractor seen in FIG. 2.

The elongated and overall non-circular or non-round overall shape of the inlet opening 108 to the chamber 88, as shown in at least FIG. 5, can minimize, if not eliminate, dead zones associated with round or circular shaped inlet openings. Moreover, as illustrated by FIG. 19, the generally straight, parallel sidewalls 198 of the inlet opening 108 can be positioned relative to the anticipated flow width of the chopped billets and crop residue (collectively identified as 206 in FIG. 19) being outputted by the chopper assembly so as to eliminate and/or reduce air flow bypassing the outputted chopped billets and crop residue along the sides of the cane material flow width. A reduction and/or elimination of such dead zones can improve the efficiency of the air flow in pulling the chopped billets and crop residue into the primary extractor 46 and/or in removing crop residue from the chopped billets. Such improvements in efficacy can reduce the power compensation utilized by the motor 72 of the fan assembly 62, including, for example, via allowing the motor 72 to operate at lower speeds. Additionally, in at least some instances, such improvements in efficiency can result in a cost savings via allowing for use of smaller, or lower powered, motors 72 for the fan assembly 62.

FIGS. 20-23 illustrate views of the extractor 46' having another configuration for the nozzle assembly 300. As seen, the nozzle assembly 300 can include one or more deflector plates 302*a*, 302*b* and at least one nozzle wall 304. The deflector plates 302*a*, 302*b* may, or may not, be part of a deflection plate assembly 92. Moreover, according to certain embodiments, he nozzle assembly 300 can include a deflection plate assembly 92 similar to that discussed above, but which is configured to be utilized with the deflector plate 302*a*, 302*b* configuration shown FIGS. 20-23. Additionally, or alternatively, the deflector plates 302*a*, 302*b* can be secured to the nozzle wall 304 in a variety of manners, including, but not limited to, via a weld and/or mechanical fasteners, including, but not limited to, bolts, screws, and rivets, among other types of fasteners.

The nozzle wall 304 can extend between a first end wall 312*a* at a first end 306*a* of the nozzle wall 304, and a second end wall 312*b* at a second end 306*b* of the nozzle wall 304. According to the illustrated embodiment, the first end 306*a* of the nozzle wall 304 can be generally vertically aligned with, or be positioned over, the sidewall 110 of the first support bracket 100*a*, while the second end 306*b* can be generally vertically aligned with, or be aligned with, the sidewall 110 of the second support bracket 100*b*. Unlike the nozzle assembly 90 previously discussed, the nozzle assembly 300 shown in FIGS. 20-23 can be configured such that either, or both, the nozzle wall 304 or the deflector plate 302*a*, 302*b* extend up to the portion of extractor 46' that generally defines the discharge area 106 that is located between the sidewalls 110 of the opposing first and second support brackets 100*a*, 100*b*. Thus, according to such an embodiment, the first and second ends 306*a*, 306*b* of the nozzle wall 304 can at least partially define, or be aligned with, a portion of the shape or profile of the discharge area 106, including a portion of the of the discharge area 106 positioned at the top, or positioned above, the sidewalls 110 of the first and second support brackets 100*a*, 100*b*. Additionally, as discussed below, the nozzle wall 304 can comprise a single, monolithic wall, or, alternatively, can comprise a collection of individual panels or sections positioned to provide the nozzle wall 304.

The nozzle wall 304 can further be outwardly and upwardly inclined from a lower end 308 to an opposing upper end 310 of the nozzle wall 304 at a first inclined angle. Thus, the nozzle wall 304 can have a generally conical configuration that can encircle a portion of the extractor 49'. Further, the lower end 308 of the nozzle wall 304 can extend along at least a portion of nozzle wall 304 at a location that can define a portion of the inlet opening 108. According to such an embodiment, the portion of the nozzle wall 304 that defines a portion of the inlet opening 108 can be configured to be extend about at least a portion of the extractor 49' along a radius that is smaller than a corresponding radius about which the upper end 310 of the nozzle wall 304 extends about at least a portion of the extractor 49'.

Figure 23:
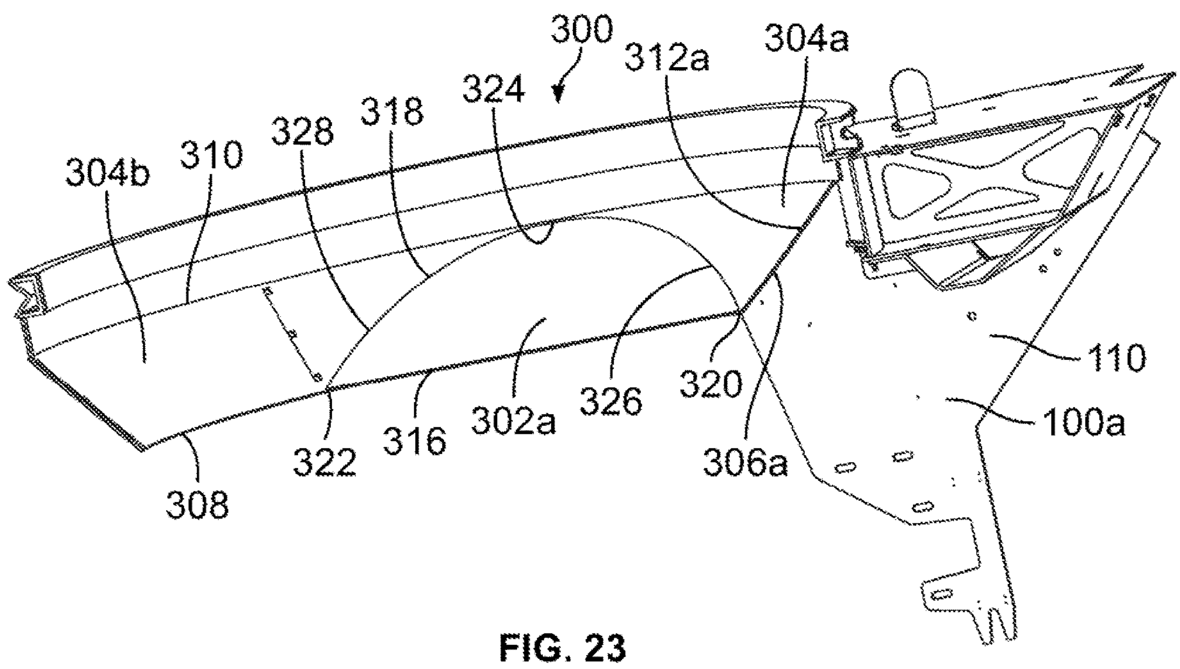
FIG. 23 illustrates a top side perspective cross sectional view of the nozzle assembly taken along line C-C in FIG. 20.

Additionally, as seen in at least FIG. 23, the first and second end walls 312*a*, 312*b* of the nozzle wall 304 can generally extend in outwardly and upwardly direction along the first inclined angle from, or around, the lower end 308 of the nozzle wall 304 to a location at, or about, the upper end 310 of the nozzle wall 304. According to such an embodiment, an upper edge 314 of the adjacent sidewall 110 of the first and second support brackets 100*a*, 100*b*, respectively, can also be angled along the first incline angle so as to generally conform to, or abut, the nozzle wall 304 at or around the corresponding adjacent first or second end wall 312*a*, 312*b* of the nozzle wall 304.

The first deflector plate 302*a* and the second deflector plate 302*b* can be positioned at opposing sides of the inlet opening 108. Similar to the previously discussed deflector plates 92, the first and second deflector plates 302*a*, 302*b* can be at opposing sides of the central axis 120, and can also include opposing back and face walls 138, 144. The first and second deflector plates 302*a*, 302*b* can generally extend outwardly and upwardly from bottom wall 316 to a top wall 318 of the deflector plate 302*a*, 302*b*. Additionally, according to certain embodiments, the first and second deflector plates 302*a*, 302*b* can each, individually, generally reside in a single planar, and, moreover, may not be concave or convex in configuration. Thus, according to certain embodiments, the first and second deflector plates 302*a*, 302*b* can generally be flat. Moreover, according to certain embodiments, at least the face wall 144 can be a generally flat, planar surface.

According to the illustrated embodiment, the top wall 318 of the deflector plates 302*a*, 302*b* can extend from opposing first and second ends 320, 322 of the bottom wall 316. The first end 320 of the bottom walls 316 of the first and second deflector plates 302*a*, 302*b* can generally be positioned at a location at which the adjacent first or second end wall 312*a*, 312*b* of the nozzle wall 304 upwardly extend toward the upper end 310 of the nozzle wall 304. Further, as seen by at least FIG. 21, the first end 320 of the lower walls 316 of the first and second deflector plates 302*a*, 302*b* can be adjacent to, or otherwise abut, a portion of the upper edge 314 of the adjacent sidewall 110 of the first and second support brackets 100*a*, 100*b*. Thus, according to certain embodiments, the first end 320 of the bottom wall 316 of the deflector plates 302*a*, 302*b* can be at a location at which the first end 320 generally converges with a lower portion of the adjacent first or second end wall 312*a*, 312*b* of the nozzle wall 304 and a lower portion of the upper edge 314 of the adjacent sidewall 110 of the first or second support bracket 100*a*, 100*b*.

Further, in the illustrated embodiment, the top wall 318 of the deflector plates 302*a*, 302*b* has a generally curved or arc shape, with the top wall 318 vertically rising to an apex 324 that is generally aligned with a central location of the bottom wall 316. The top wall 318 however can have a variety other configurations or shapes. Additionally, similar to the nozzle wall 304, the first and second deflector plates 302*a*, 302*b* can also be generally outwardly and upwardly inclined in the same general direction as the nozzle wall 304, but at the second incline angle, which, again, is different than the first incline angle of the nozzle wall 304.

The top wall 318 of the deflector plates 302*a*, 302*b* can further provide a boundary between the deflector plate 302*a*, 302*b* and adjacent portions of the nozzle wall 304. Moreover, the top wall 318 of the deflector plates 302*a*, 302*b* can provide a location at which the extractor 49' generally transitions from the flat planar surface of the deflector plate 302*a*, 302*b* to the curved nozzle wall 304 that generally extends in a circular direction between the opposing first and second ends 306*a*, 306*b* of the nozzle wall 304. Additionally, according to certain embodiments, the apex 324 of the top wall 318 can be at a location that is at a similar vertical height as the upper end 310 of the nozzle wall 304, thereby resulting in the nozzle wall 304 being separated, or not continuously extending, between the first and second ends 312*a*, 312*b* of the nozzle wall 304. For example, the nozzle wall 304 can include a first section 304*a* that is between the first end 312*a* of the nozzle wall 304 and a first side 326 of the arc-shaped top wall 318 of the first deflector plate 302*a*, a second portion 304*b* that extends from a second side 328 of the first deflector plate 302*a* to a second side 328 of the second deflector plate 302*b*, and a third portion 304*c* that extends from a first side 326 of the second deflector plate 302*b* to the second end 312*b* of the nozzle wall 304.

Figure 20:
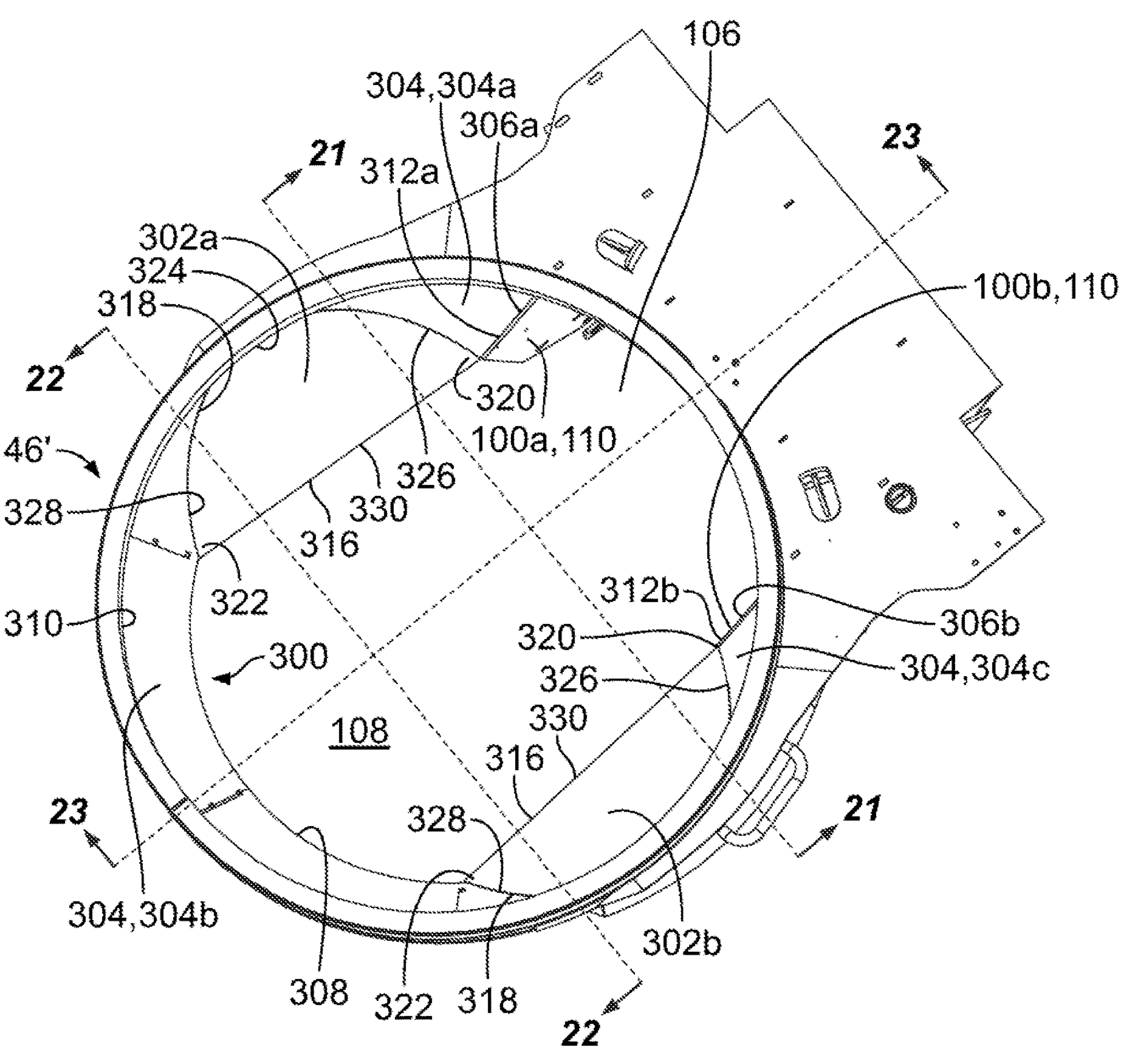
FIG. 20 illustrates a top side perspective of a portion of the extractor having another embodiment for a nozzle assembly.
Figure 21:
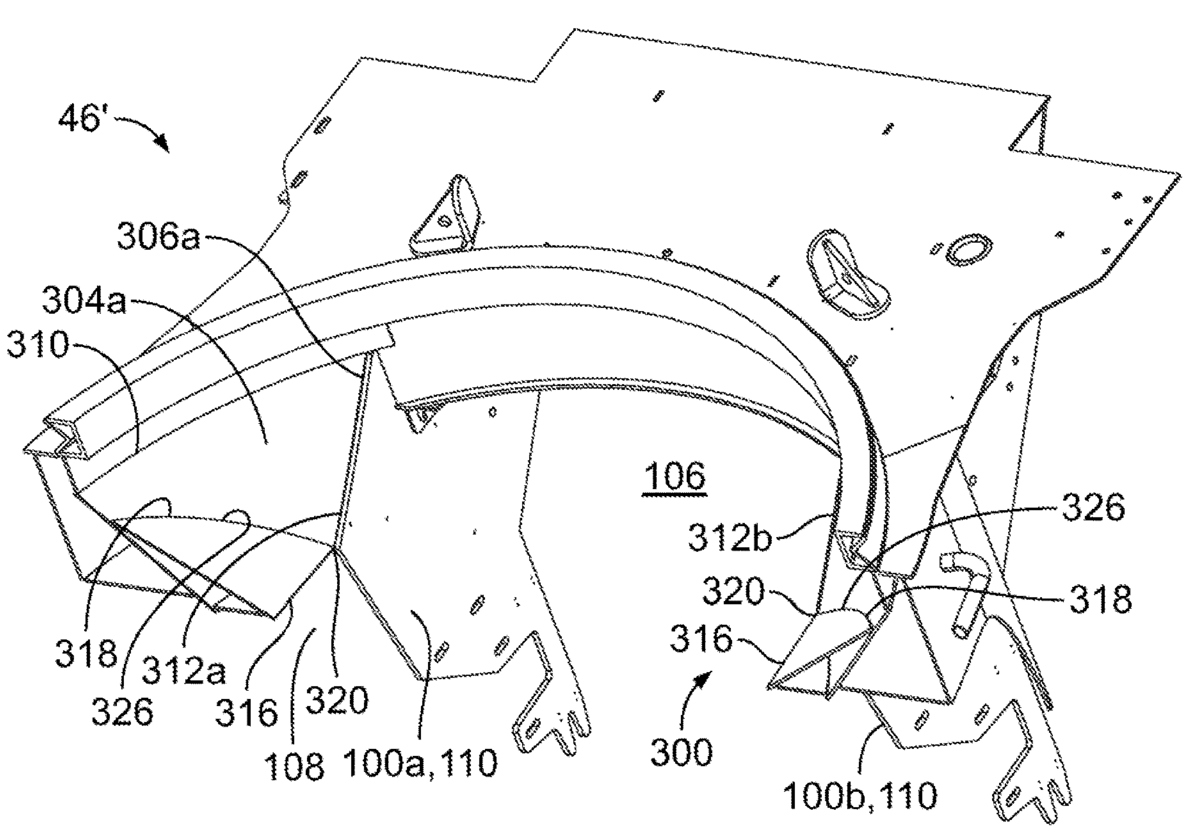
FIG. 21 illustrates a top side perspective cross sectional view of the nozzle assembly taken along line A-A in FIG. 20.
Figure 22:
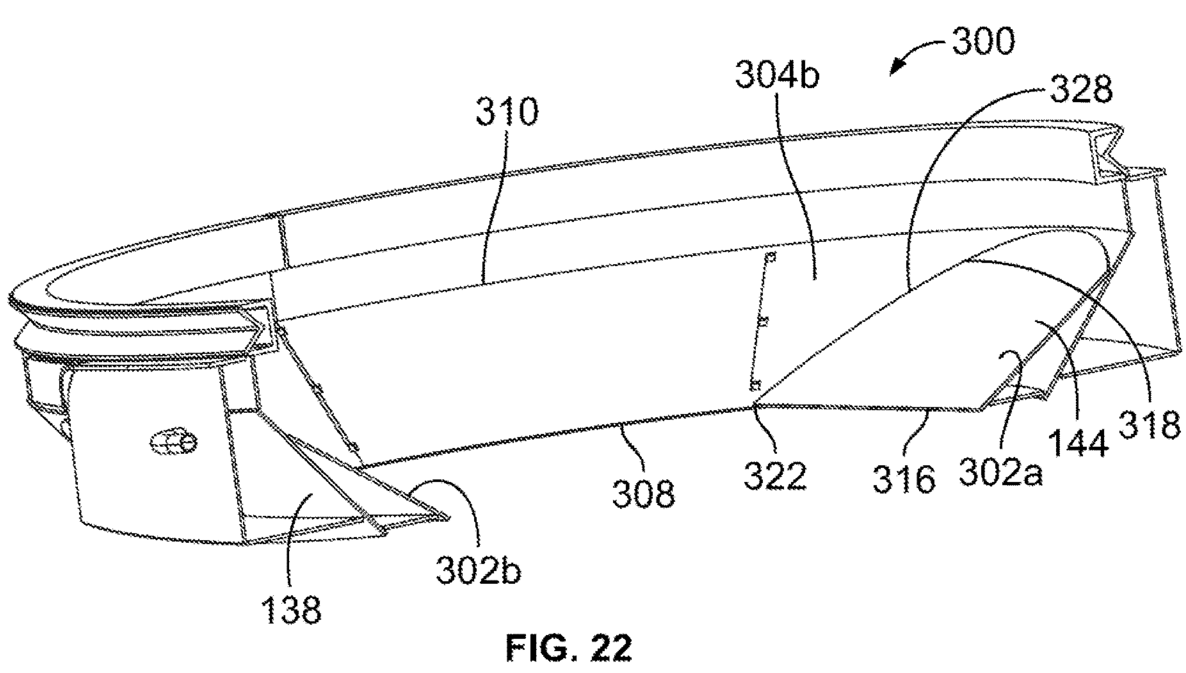
FIG. 22 illustrates a top side perspective cross sectional view of the nozzle assembly taken along line B-B in FIG. 20.

As seen in at least FIG. 20, each of the first and second deflector plates 302*a*, 302*b* is also positioned so the bottom wall 316 of the associated deflector plate 302*a*, 302*b* generally defines at least a portion of the inlet opening 108 to the chamber 88 of the of the primary extractor 46'. As seen in at least FIG. 20, the lower walls 316 of the first and second deflector plates 302*a*, 302*b* can generally define straight, or non-curved, opposing sidewalls 330 of, or to, the inlet opening 108. As also seen in at least FIG. 20, with respect to at least a profile of the inlet opening 108, such lower walls 316 can be generally parallel to each other.

Further, in the illustrated embodiment, the inlet opening 108 can further be defined by the curved lower end 308 of the nozzle wall 304 that extends between, and may connect, the bottom walls 316 of the first and second deflector plates 302*a*, 302*b*. Thus, as seen in at least FIG. 20, the profile of the inlet opening 108 can be relatively straight at the portions that are adjacent to the first and second deflector plates 302*a*, 302*b*, and curved along a portion of the nozzle wall 304 that extends between the first and second deflector plates 302*a*, 302*b*. Additionally, the generally straight portion of the profile of the inlet opening 108 that is generally defined by the bottom walls 316 of the first and second deflector plates 302*a*, 302*b* can be continued by the sidewalls 110 of the support brackets 100*a*, 100*b* into the discharge area 106. Moreover, with respect to the shapes of the profiles of the inlet opening 108 and the discharge area 106, the first end 320 of the lower walls 316 of the first and second deflector plates 302*a*, 302*b* can be adjacent to, or otherwise abut, the adjacent sidewall 110 of a support bracket 100*a*, 100*b* such that the generally straight, or non-curved, portion of the profile of the inlet opening 108 is aligned with, and continued into the discharge area 106, by the sidewalls 110 of the first and second support brackets 100*a*, 100*b*.

In view of the configuration of the nozzle assembly 300, including the deflector plates 302*a*, 302*b*, and the at least one nozzle wall 304, the deflector plates 302*a*, 302*b*, in FIGS. 20-23 may not include a deflection section 158, or a first lower sidewall 154 of the previously discussed deflectors plates 122. Additionally, incorporation of the nozzle assembly 300 shown in FIGS. 20-23 can also eliminate, or cover, the front wall 112*a*, 112*b* and top wall 114 of the support bracket 100*a*, 100*b*, as well as eliminate the above-discussed transition plate 190 that, with respect to other embodiments, can be secured to the face wall 112*a* of each support bracket 100*a*. 100*b*.

While the above exemplary embodiments are discussed with respect to a primary extractor, embodiments of the subject disclosure are also applicable to other extractors, including, but not limited to, secondary extractors. Further, while exemplary embodiments incorporating the principles of the present disclosure have been described hereinabove, the present disclosure is not limited to the described embodiments. Instead, this application is intended to cover any variations, uses, or adaptations of the disclosure using its general principles. Further, this application is intended to cover such departures from the present disclosure as come within known or customary practice in the art to which this disclosure pertains and which fall within the limits of the appended claims.

The invention claimed is:

1. An extractor for a crop harvester configured to receive a crop material outputted from a chopper assembly of the crop harvester, the extractor comprising:

an extractor body having a chamber that extends between a first end and a second end of the extractor body, the first end positioned to receive entrance of the crop material into the chamber, the first end of the extractor body defining an inlet opening into the chamber, the inlet opening having a non-circular shape across the inlet opening, wherein the non-circular shape has a width that is equal to or larger than a material flow width of the crop material outputted from the chopper assembly.

2. The extractor of claim 1, wherein the extractor body includes an inlet portion and a body portion, the inlet portion positioned between the first end and the body portion and comprising a nozzle wall and at least one deflection plate assembly, wherein the at least one deflection plate assembly defines at least a relatively straight portion of the inlet opening, and wherein the nozzle wall defines at least a portion of the chamber.

3. The extractor of claim 2, wherein the at least one deflection plate assembly is secured to the nozzle wall and includes a deflector plate, the nozzle wall being inclined at a first inclined angle, the deflector plate defining a portion of the inlet opening, a portion of the deflector plate being inclined away from the inlet opening at a second incline angle, the second incline angle being different than the first incline angle.

4. The extractor of claim 2, wherein the at least one deflection plate assembly comprises a first deflection plate assembly and a second deflection plate assembly, wherein the first and second deflection plate assemblies define at least portions of opposing side walls of the inlet opening.

5. The extractor of claim 4, wherein the first deflection plate assembly defines at least a portion of a first sidewall of the inlet opening, and wherein the second deflection plate assembly defines at least a portion of a second sidewall of the inlet opening, wherein the portion of the first sidewall defined by the first deflection plate assembly is generally parallel to the portion of the second sidewall defined by the second deflection plate assembly.

6. The extractor of claim 3, wherein the deflector plate has a lower wall and a top wall, the top wall extending from opposing ends of the lower wall.

7. The extractor of claim 6, wherein the top wall upwardly extends from the lower wall in a curved orientation, the top wall having an apex that is centrally located about the top wall at a location that is at aligned with a center portion of the lower wall.

8. An extractor for a harvesting machine, the extractor comprising:

- a nozzle wall having an upper end and a lower end, the nozzle wall being outwardly and upwardly inclined at a first angle from the lower end to the upper end, the upper end being arranged at a first radius about a central axis, the lower end being arranged at a second radius about the central axis, the first radius being greater that the second radius;
- a first deflector plate and a second deflector plate positioned on opposing sides of the central axis and abut the nozzle wall, the first and second deflector plates each having a top wall, a bottom wall, and a face wall, the face wall extending between the top wall and the bottom wall and being planar, the first and second deflector plates being outwardly and upwardly inclined at a second angle from the bottom wall to the top wall, the second angle being different than the first angle,
- wherein the bottom wall of the first deflector plate defines a first straight sidewall of a profile of an inlet opening of the extractor, and the bottom wall of the second deflector plate defines a second straight sidewall of the profile of an inlet opening.

9. The extractor of claim 8, wherein a portion of the lower end of the nozzle wall defines a curved wall for the profile of the inlet opening.

10. The extractor of claim 9, wherein the nozzle wall has a conical configuration, and wherein the first straight sidewall is parallel to the second straight sidewall.

11. The extractor of claim 10, wherein the top wall extends from opposing ends of the bottom wall and along an adjacent portion of the nozzle wall to an apex, the apex being positioned to align with a center location of the bottom wall at a central location about the top wall.

12. The extractor of claim 8, wherein the nozzle wall comprises:

- a first section positioned between a first end of the nozzle wall and a first side of the first deflector plate;
- a second section positioned between a second side of the first deflector plate and a second side of the second deflector plate; and
- a third section positioned between a first side of the second deflector plate and a second end of the nozzle wall.

13. The extractor of claim 8, wherein the extractor further includes a discharge area in fluid communication with the inlet opening and having a profile defined at least in part by a first sidewall of a first support bracket and a second sidewall of a second support bracket, the bottom wall of the first deflector plate being linearly aligned with the first sidewall and the bottom wall of the second deflector plate being linearly aligned with the second sidewall, and wherein the profile of the discharge area is different than the profile of the inlet opening.

14. An extractor comprising:

- a fan assembly having a fan housing defining a cavity; and
- an extractor body that defines a chamber that extends from a first end of the extractor body to a second end of the extractor body, the chamber being in fluid communication with the cavity, the extractor body defining an inlet opening of the chamber at the first end, the inlet opening having a non-round shape, the extractor body further comprising at least one deflection plate assembly that defines at least opposing relatively straight side walls of the inlet opening, the second end being coupled to the fan assembly.

15. The extractor of claim 14, wherein the extractor body includes an inlet portion and a body portion, the inlet portion positioned between the first end and the body portion and comprising a nozzle wall and the at least one deflection plate assembly, and wherein the nozzle wall defines at least a portion of the chamber.

16. The extractor of claim 15, wherein the at least one deflection plate assembly is secured to the nozzle wall and includes a deflector plate, the nozzle wall being inclined at a first inclined angle, the deflector plate defining a portion of the inlet opening, at least a portion of the deflector plate being inclined at a second incline angle away from the inlet opening and to a top wall of deflector plate, the second incline angle being different than the first incline angle.

17. The extractor of claim 15, wherein the at least one deflection plate assembly comprises a first deflection plate assembly and a second deflection plate assembly, wherein the first and second deflection plate assemblies define at least portions of the opposing relatively straight side walls of the inlet opening.

18. The extractor of claim 17, wherein the first deflection plate assembly defines at least a portion of a first sidewall of the inlet opening, and wherein the second deflection plate assembly defines at least a portion of a second sidewall of the inlet opening, wherein the portion of the first sidewall defined by the first deflection plate assembly is generally parallel to the portion of the second sidewall defined by the second deflection plate assembly.

19. The extractor of claim 16, wherein the deflector plate is planar and the nozzle wall has a conical configuration, and wherein opposing sides of the deflector plate abut the nozzle wall.

20. The extractor of claim 19, wherein deflector plate includes a top wall and a bottom wall, the top wall extends from opposing ends of the bottom wall to an apex and is adjacent to a portion of the nozzle wall, the apex being positioned at a central location along the top wall that aligns with a central portion of the bottom wall.

* * * * *